United States Patent
Chen et al.

(10) Patent No.: US 9,830,528 B2
(45) Date of Patent: Nov. 28, 2017

(54) ROTATION INVARIANT OBJECT FEATURE RECOGNITION

(71) Applicant: Axis AB, Lund (SE)

(72) Inventors: Jiandan Chen, Lund (SE); Anders Lloyd, Lund (SE); Niclas Danielsson, Lund (SE)

(73) Assignee: Axis AB, Lund (SE)

( * ) Notice: Subject to any disclaimer, the term of this patent is extended or adjusted under 35 U.S.C. 154(b) by 33 days.

(21) Appl. No.: 14/963,792

(22) Filed: Dec. 9, 2015

(65) Prior Publication Data

US 2017/0169306 A1    Jun. 15, 2017

(51) Int. Cl.
*G06K 9/46* (2006.01)
*G06K 9/62* (2006.01)

(52) U.S. Cl.
CPC ............. *G06K 9/4647* (2013.01); *G06K 9/46* (2013.01); *G06K 9/6202* (2013.01)

(58) Field of Classification Search
None
See application file for complete search history.

(56) References Cited

U.S. PATENT DOCUMENTS

| 8,687,891 | B2 | 4/2014 | Takacs et al. | |
| 2012/0093420 | A1* | 4/2012 | Zhang | G06K 9/4647 382/197 |
| 2012/0213422 | A1* | 8/2012 | Niskanen | G06K 9/00228 382/118 |
| 2013/0089260 | A1* | 4/2013 | Pires | G06K 9/4619 382/190 |
| 2013/0223683 | A1* | 8/2013 | Jiang | G06K 9/4638 382/103 |
| 2013/0223737 | A1* | 8/2013 | Anbai | G06K 9/4671 382/170 |
| 2014/0044359 | A1 | 2/2014 | Rousson | |

(Continued)

FOREIGN PATENT DOCUMENTS

EP    2434431 A1    3/2012

OTHER PUBLICATIONS

Zhang et al., "Face Detection Based on Multi-Block LBP Representation," Proc. Int. Conf. Biometrics, pp. 11-18, 2007.*

(Continued)

*Primary Examiner* — Matthew Bella
*Assistant Examiner* — Soo Shin
(74) *Attorney, Agent, or Firm* — Snyder, Clark, Lesch & Chung, LLP

(57) ABSTRACT

A method may include determining a value indicative of an average intensity of blocks in an image. The blocks include a primary and outer blocks. Each of the outer blocks may have three, five, or more than five pixels. The image may describe an external pixel lying between the primary and at least one of the outer blocks. The external pixel may not contribute to the value indicative of the average intensity of any of the blocks. The image may also describe a common internal pixel lying within two of the blocks. The common pixel may contribute to the value indicative of the average intensity of the two of the blocks. The method may include comparing the value indicative of the average intensity of the primary block to the values of the outer blocks, and quantifying a feature represented by the image by generating a characteristic number.

20 Claims, 18 Drawing Sheets

(56) References Cited

U.S. PATENT DOCUMENTS

| | | |
|---|---|---|
| 2014/0105487 A1 | 4/2014 | Irie |
| 2014/0169681 A1 | 6/2014 | Drake |
| 2014/0226906 A1 | 8/2014 | Kang |
| 2014/0233859 A1 | 8/2014 | Cho et al. |
| 2014/0270364 A1 | 9/2014 | Baranowski et al. |
| 2014/0270551 A1 | 9/2014 | Baranowski et al. |
| 2014/0294293 A1 | 10/2014 | Yamamura |
| 2014/0301636 A1 | 10/2014 | Bartlett et al. |
| 2014/0301647 A1 | 10/2014 | Mase et al. |
| 2014/0314323 A1 | 10/2014 | Zhang et al. |
| 2014/0328543 A1 | 11/2014 | Iwamoto et al. |
| 2015/0058579 A1* | 2/2015 | Xu .................. G06K 9/00973 711/141 |
| 2016/0180187 A1* | 6/2016 | Lefebvre ............ G06K 9/4671 382/103 |

OTHER PUBLICATIONS

Lindhal, "Study of Local Binary Patterns," Master's thesis, Linköpings Tekniska Högskola, 2007.*

Extended European Search Report issued in corresponding EP Application No. 15199802.8, dated Jul. 22, 2016, 8 pages.

Zhang, Lun et al., "Face Detection Based on Multi-Block LBP Representation," Center for Biometrics and Security Research & National Laboratory of Pattern Recognition Institute of Automation, Chinese Academy of Sciences, Beijing, China, 9 pages, (2007).

Pietikainen, Matti et al., "Computer Vision Using Local Binary Patterns," Computations Imaging and Vision, Utrecht University, Utrecht, The Netherlands, vol. 40, pp. 1-207, (2011).

Papakostas, G.A. et al., "Moment-based local binary patterns: A novel descriptor for invariant pattern recognition applications," Nerucomputing, www.elsevier.com/locate/neucom, pp. 358-371, (2012).

Davarzani, Reza et al. "Robust Image Description with Weighted and Adaptive Local Binary Pattern Features," 22nd International Conference on Pattern Recognition, pp. 1097-1102, (2014).

Zhang, Zili et al., "A Comparison of Moments-Based Logo Recognition Methods," Abstract and Applied Analysis, Hindawi Publishing Corporation, vol. 2014, 9 pages, (Aug. 12, 2014).

Qu, Xiujie et al. "A Novel Fast and Robust Binary Affine Invariant Descriptor for Image Matching," Mathematical Problems in Engineering, Hindawi Publishing Corporation, vol. 2014, 8 pages, (Mar. 4, 2014).

Wang, Jianyong et al., "CS-FREAK: An Improved Binary Descriptor," Department of Automation, Xi'an Institution of High-Tech, Xi'an, China, IGTA, CCIS, 8 pages, (2014).

Krig, Scott, "Interest Point Detector and Feature Descriptor Survey," Computer Vision Metrics, pp. 217-282, (May 26, 2014).

Sharma, Riti, "Object Detection using Dimensionality Reduction on Image Descriptors," Thesis/Dissertation Collections, RIT Scholar Works, Rochester Institute of Technology, 89 pages, (Jun. 2014).

Wu, Song et al. "RIFF: Retina-inspired Invariant Fast Feature Descriptor," LIACS Media Lab, Leiden University, The Netherlands, pp. 1129-1132, (Nov. 2014).

Willemin, Fabien, "Robust visual tracking using feature selection," Master thesis, Ecole Polytechnique Federale de Lausanne, 66 pages, (2013).

Ahonen, Timo et al., "Rotation Invariant Image Description with Local Binary Pattern Histogram Fourier Features," Machine Vision Group, University of Oulu, Finland, pp. 61-70, (2009).

Flusser, Jan et al., "Rotation Moment invariants for Recognition of Symmetric Objects," IEEE Transactions on Image Processing, vol. 15, No. 12, pp. 3784-3790, (Dec. 2006).

Alahi, Alexandre et al., "FREAK: Fast Retina Keypoint," Ecole Polytechnique Federale de Lausanne, Computer Vision and Pattern Recognition, 8 pages, (Jun. 2012).

Yenchi Wang et al., "Local Block-Difference Pattern for Use in Gait-Based Gender Classification," Journal of Information Science and Engineering, vol. 31, pp. 1993-2008, Nov. 1, 2015.

Rakesh Mehta et al., "Gender Classification by LUT Based Boosting of Overlapping Block Patterns," Network and Parallel Computing, vol. 9127, pp. 530-542, Jun. 9, 2015.

* cited by examiner

ROTATION INVARIANT OBJECT FEATURE RECOGNITION

BACKGROUND INFORMATION

As cameras and other monitoring devices become less expensive, these devices are proliferating. As these devices proliferate, the cameras and devices are being used for object and feature detection in the captured images and video.

SUMMARY

A method is disclosed. The method may include receiving image data and determining a value indicative of an average intensity of each of a plurality of blocks in the image data. In one embodiment, the blocks include a primary block and outer blocks and the outer blocks surround the primary block. In one embodiment, each of the blocks includes an odd number of pixels greater than one and the odd number of pixels in each block is identical. In one embodiment, each block is centered on a center of a pixel. In one embodiment, the image data describes external pixels lying between the primary block and each of the outer blocks, wherein the external pixels do not contribute to the value indicative of the average intensity of any of the blocks. The method may include comparing the value indicative of the average intensity of the primary block to each value indicative of the average intensity of each of the outer blocks, and quantifying a feature represented by the image data by generating a characteristic number based on the comparison.

In one embodiment, the image data describes a common internal pixel lying within two of the blocks and the common internal pixel contributes to each value indicative of the average intensity of each of the two blocks.

In one embodiment, the method may include receiving image data and determining a value indicative of an average intensity of each of a plurality of blocks in the image data. In one embodiment, the blocks include a primary block and outer blocks and the outer blocks surround the primary block. In one embodiment, each of the outer blocks has three, five, or more than five pixels. In one embodiment, the image data describes an external pixel lying between the primary block and at least one of the outer blocks, in which the external pixel does not contribute to the value indicative of the average intensity of any of the blocks. In one embodiment, the image data describes a common internal pixel lying within two of the blocks, wherein the common internal pixel contributes to the value indicative of the average intensity of the two of the blocks. The method may include comparing the value indicative of the average intensity of the primary block to the values indicative of the average intensities of the outer blocks, and quantifying a feature represented by the image data by generating a characteristic number based on the comparison.

In one embodiment, each block includes an odd number of pixels and is centered on a center of a pixel. In one embodiment, each block includes an even number of pixels and covers only whole pixels.

In one embodiment, the method includes quantifying a feature represented by image data. The method may further include receiving image data and determining a value indicative of an average intensity of each of a plurality of blocks in the image data. In one embodiment, the blocks include a primary block and outer blocks, the outer blocks surround the primary block, each of the outer blocks has an odd number of pixels greater than one, each block is centered on a pixel, the odd number of pixels in each block is identical, and the image data describes external pixels lying between the primary block and each of the outer blocks, wherein the external pixels do not contribute to the value indicative of the average intensity of the primary block and do not contribute to the value indicative of the average intensity of any of the outer blocks. The method may include comparing the value indicative of the average intensity of the primary block to the values indicative of the average intensities of the outer blocks, and quantifying a feature represented by the image data by generating a characteristic number based on the comparison.

In one embodiment, the image data describes a common internal pixel lying within two of the blocks, wherein the common internal pixel contributes to the value indicative of the average intensity of the two of the blocks.

In another embodiment, the method may include receiving image data and determining a value indicative of an average intensity of each of a plurality of blocks in the image data. In one embodiment, the blocks include a primary block and outer blocks and the outer blocks surround the primary block. Each of the outer blocks may have three, five, or more than five pixels. In one embodiment, the image data describes an external pixel lying between the primary block and at least one of the outer blocks, wherein the external pixel does not contribute to the value indicative of the average intensity of the primary block and does not contribute to the value indicative of the average intensity of the outer blocks. In one embodiment, the image data describes a common internal pixel lying within two of the blocks, wherein the common internal pixel contributes to the value indicative of the average intensity of the two of the blocks. In one embodiment, the method includes comparing the value indicative of the average intensity of the primary block to the values indicative of the average intensities of the outer blocks, and quantifying a feature represented by the image data by generating a characteristic number based on the comparison.

In one embodiment, each block includes an odd number of pixels and is centered on the center of a pixel. In one embodiment, each block includes an even number of pixels and covers only whole pixels. In one embodiment, the number of pixels in each block is identical.

In one embodiment, the image data describes external pixels lying between the primary block and each of the outer blocks, and the external pixels do not contribute to the values indicative of the average intensity of any of the blocks.

In one embodiment, quantifying the feature may include comparing the value indicative of the average intensity of the primary block to each of the values indicative of the average intensity the outer blocks and representing comparisons with a binary value.

In one embodiment, the method may include determining locations of the outer blocks surrounding the primary block by spacing the outer blocks at a distance from the primary block to avoid the primary block from being contiguous with at least one of the outer blocks.

In one embodiment, the method may include determining locations of the outer blocks surrounding the primary block such that each of the outer blocks is centered on the center of a pixel.

In one embodiment, the primary block encompasses a primary location and the method may include determining a direction, about the primary location, associated with the image data, and determining locations of the outer blocks surrounding the primary block based on the direction.

In one embodiment, determining the direction may include determining a gradient direction of intensity of the image data near the primary location.

A device is also disclosed. In one embodiment, the device may include a memory to store image data. The device may include a processor to determine a value indicative of an average intensity of each of a plurality of blocks in the image data. In one embodiment, the blocks include a primary block and outer blocks, the outer blocks surround the primary block, each of the outer blocks has three, five, or more than five pixels. In one embodiment, the image data may describe an external pixel lying between the primary block and at least one of the outer blocks. The external pixel may not contribute to the value indicative of the average intensity of the primary block and does not contribute to the value indicative of the average intensity of the outer blocks. In one embodiment, the image data may describe a common internal pixel lying within two of the blocks, in which the common internal pixel contributes to the value indicative of the average intensity of the two of the blocks. The processor may be configured to compare the value indicative of the average intensity of the primary block to the values indicative of the average intensities of the outer blocks, and quantify quantifying a feature of an object represented within the image data by generating a characteristic number based on the comparison.

In one embodiment, each block includes an odd number of pixels and is centered on the center of a pixel. In one embodiment, each block includes an even number of pixels and covers only whole pixels. In one embodiment, the number of pixels in each block is identical.

In one embodiment, the image data describes external pixels lying between the primary block and each of the outer blocks. In one embodiment, the external pixels do not contribute to the values indicative of the average intensity of any of the blocks.

In one embodiment, the processor is configured to compare the value indicative of the average intensity of the primary block to each of the values indicative of the average intensity the outer blocks and represent comparisons with a binary value.

In one embodiment, the processor is configured to determine locations of the outer blocks surrounding the primary block by spacing the outer blocks at a distance from the primary block to avoid the primary block from being contiguous with at least one of the outer blocks.

In one embodiment, the processor is configured to determine locations of the outer blocks surrounding the primary block such that each of the outer blocks is centered on the center of a pixel.

In one embodiment, the primary block encompasses a primary location, and the processor is configured to determine a direction, about the primary location, associated with the image data. The processor may be configured to determine locations of the outer blocks surrounding the primary block based on the direction.

In one embodiment, the processor is configured to determine the direction by determining a gradient direction of intensity of the image data near the primary location.

DETAILED DESCRIPTION OF EMBODIMENTS

The following detailed description refers to the accompanying drawings. The same reference numbers in different drawings identify the same or similar elements.

Cameras, including legacy cameras that are already deployed, may have limited processing power to perform image processing (such as object detection or recognition, contrast enhancement, etc.). The limited processing power of a camera makes object and feature recognition (e.g., by the camera of features and/or objects represented by image data) more challenging than if processing power were not a limiting factor. While a server computer may have more processing power than a camera, in some instances a server may not be well situated to perform object recognition. That is, the server may be remotely located from the camera, and bandwidth between the camera and the server may be limited. In addition, a camera may alter raw image data (e.g., demosaicing and/or lossy compression) to conserve bandwidth before transmitting an image or video to another device. If a camera were to transmit the image data (raw or compressed) to a server for object recognition, the transmission of data takes time and doing so may increase the time it takes to recognize an object once an image is captured. Therefore, a server may not have easy access to the best image data captured by the camera and may not have the best data to perform object or feature recognition. The processing power of the camera could be increased for enhanced object recognition (e.g., to be comparable to a server), or the server could be placed near the camera, but doing so increases the cost of the camera and/increases the complexity of installing the system. Nonetheless, such less-optimal solutions described above may be used and incorporated to the methods and systems described herein for improved performance.

Methods and systems described below enable a camera to detect or recognize features or objects in an image and/or video with, in one embodiment, the limited processing power of a camera. Further, if the recognition is performed by the camera, the methods and systems may use raw images captured by the camera before, for example, compression and transmission to a different device. Even though embodiments described below enable a camera with limited processing power to detect features in an image, the methods described below may be used by devices other than cameras with more powerful processors, such as a server. In this case, the methods and systems described below may allow for the server to process more images more quickly, for example, with the given processing power. Servers may also be more suitable for processing images taken with sensors having very high resolutions (e.g., ultra-high definition).

Figure 1A:
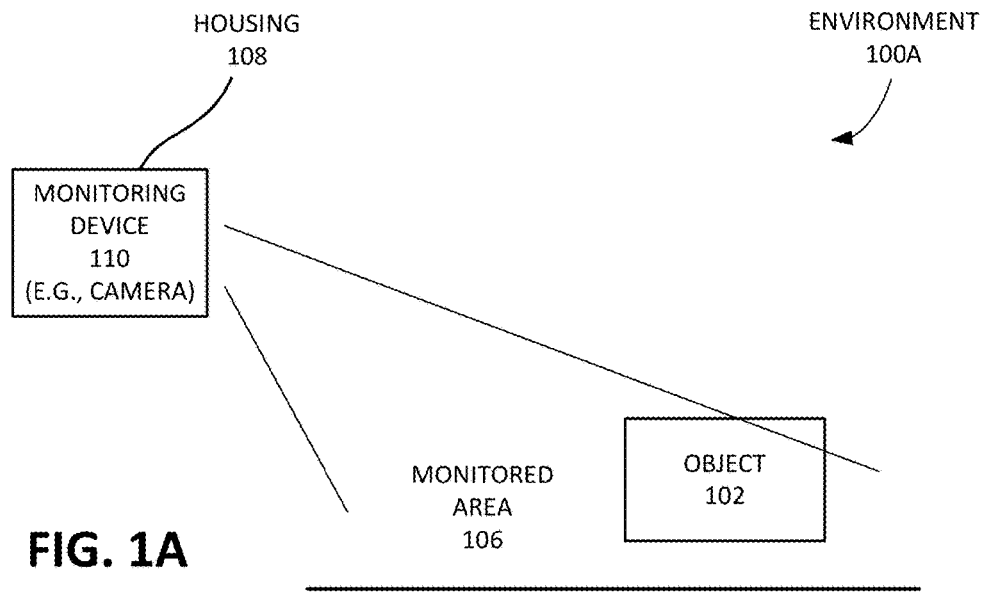
FIG. 1A illustrates an exemplary monitoring device (e.g., a camera) monitoring an area with an object in one embodiment.

FIG. 1A is a diagram of an exemplary environment 100A which may include a monitoring device 110 (e.g., a camera) monitoring an area 106 with an object 102. Object 102 may include a person, an animal, a vehicle, a license plate on a vehicle, etc. An image of object 102 captured by monitoring device 110 may include features that allow for identifying or recognizing object 102. Monitoring device 110 in the example of FIG. 1A is a camera (which may be referred to as camera 110) with a housing 108.

Monitoring device 110 (e.g., a camera) may include one or more devices for capturing images of monitored area 106. Monitoring device 110 may include, for example, a video camera that captures image data using visible light, infrared light, and/or other non-visible electromagnetic radiation (e.g., a radar for radar imaging). The captured image data may include a continuous image sequence (e.g., video), a limited image sequence, still images, and/or a combination thereof. Monitoring device 110 may include a digital camera for capturing and digitizing images and/or an analog camera for capturing images and storing image data in an analog format.

Figure 1B:
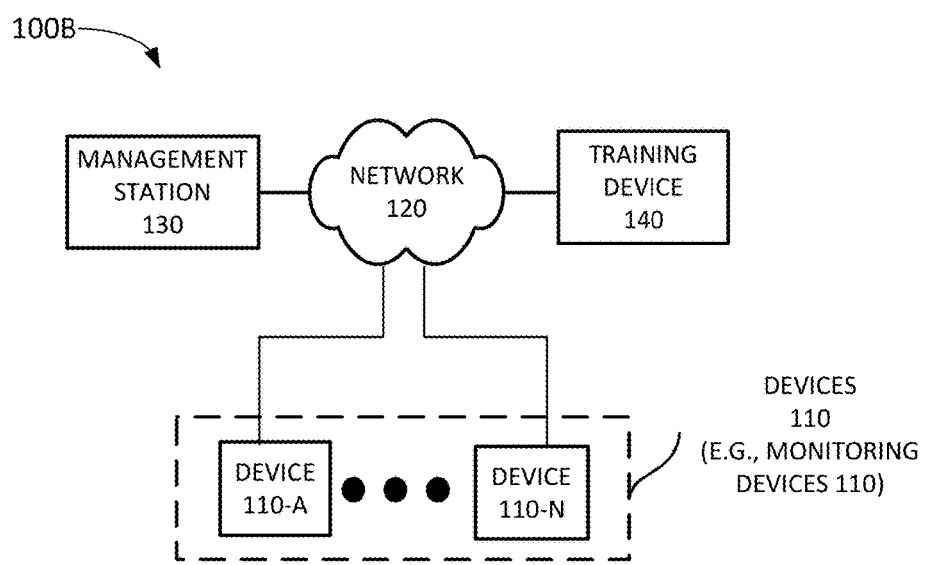
FIG. 1B illustrates another exemplary environment in which embodiments described herein may be implemented.

Monitoring device 110 may recognize features of objects in captured images of those objects. Monitoring device 110 may recognize the object based on whether the captured image has features that match "characterizing features" associated with the object, for example. The characterizing features may be determined during "training" and the characterizing features may be stored in monitoring device 110. Although not shown in FIG. 1A, the generation of the characterizing features (i.e., training) may be performed by a training device, separate from monitoring device 110. FIG. 1B is a block diagram of another exemplary environment 100B including a training device 140.

As shown in FIG. 1B, environment 100B may include monitoring devices 110, a network 120, as well as training device 140. Environment 100B may also include a management station 130. Devices 110 may include devices 110-A through 110-N (referred to collectively as "devices 110" and individually as "device 110"). As noted above, monitoring device 110 may include sensors which may produce data arranged in one or more two-dimensional array(s) (e.g., image data or video data). Monitoring device 110 and its sensors may include a camera, such as a thermal camera, a radar (e.g., for radar imaging), etc. In another embodiment, device 110 may include a controller with one or more peripherals connected to the controller (such as a camera). Monitoring device 110 may be used, for example, in a physical access control system (PACS) to identity of a person attempting to gain access to a secure area.

Network 120 may enable devices in environment 100B to communicate with each other. For example, devices 110 may communicate with each other and management station 130 and/or management station 130 may communicate with any one of devices 110. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, a wireless mesh network, an intranet, the Internet, a fiber optic-based network, a wireless network, and/or a combination of these or other types of networks.

Devices 110 may send data to management station 130 through network 120. For example, camera 110 may stream images or video to management station 130 for a person to view on a display. Management station 130 and training device 140 may also send data through network 120 to device 110. For example, training device 140 may send characterizing features to camera 110 for detecting objects associated with those characterizing features.

Management station 130 and training device 140 may include any computing device configured for communicating with device 110. For example, management station 130 and training device 140 may include a personal computer or a workstation (e.g., with a monitor, keyboard, mouse, etc.), a server device, a laptop, a tablet computer, a portable communication device (e.g., a mobile phone, a smartphone, and/or another type of wireless device), a server device, and/or any type of device with computing and communication capability.

Training device 140 may include a computer to input images and/or video and determine characterizing features of images and/or objects in images. Camera 110 may use the characterizing features for detecting those objects or features in images or video of monitored area 106. For example, training device 140 may receive thousands of images of vehicles with license plates and determine characterizing features of license plates. Camera 110 may use these characterizing features to determine when a license plate (e.g., on a vehicle) has entered monitored area 106. Characterizing features may also describe digits on license plates. Thus, after camera 110 determines that a license plate is in an image, camera 110 may also determine the characters appearing on the license plate, for example.

Although FIGS. 1A and 1B show exemplary components of environments 100A and 100B, in other implementations, environments 100A and 100B may include fewer components, different components, differently arranged components, or additional components than depicted in FIGS. 1A and 1B. Additionally or alternatively, any one device (or any group of devices) may perform functions described as performed by one or more other devices. For example, camera 110 or management station 130 may also perform training (i.e., described as being performed by training device 140).

Figure 2:
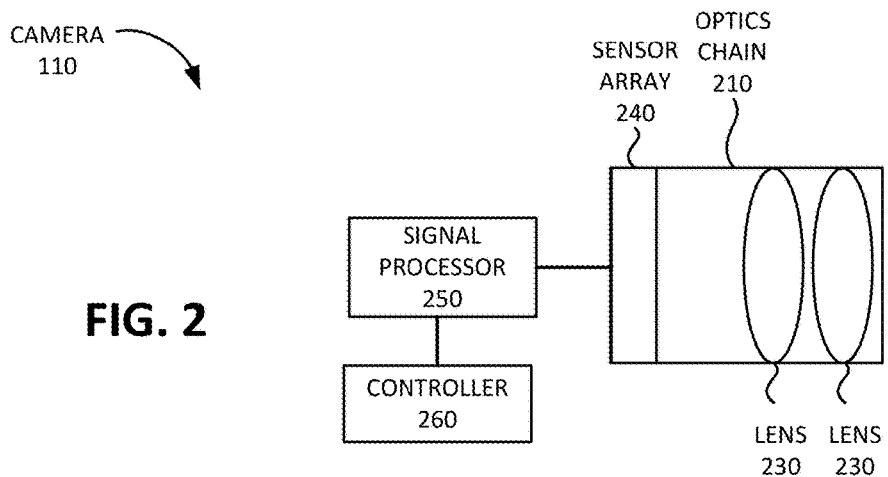
FIG. 2 is a block diagram illustrating exemplary components of a monitoring device (e.g., a camera) in one embodiment.

FIG. 2 is a diagram illustrating exemplary components of a monitoring device implemented as a camera 110 in one embodiment. As shown in FIG. 2, camera 110 may include an optics chain 210, a sensor array 240, a signal processor 250, and a controller 260.

Optics chain 210 may include an enclosure that directs incident radiation (e.g., light, visible light, infrared waves, millimeter waves, etc.) to a sensor array 240 to capture an image based on the incident radiation. Optics chain 210 may include lenses 230, as well as the sensor array 240. Lenses 230 may collect and focus the incident radiation from monitored area 106 onto sensor array 240.

Sensor array 240 may include an array of sensors for registering, sensing, and measuring radiation (e.g., light) incident or falling onto sensor array 240. The radiation may be in the visible light wavelength range, the infrared wavelength range, or other wavelength ranges. Sensor array 240 may include, for example, a charged coupled device (CCD) array and/or an active pixel array (e.g., a complementary metal-oxide-semiconductor (CMOS) sensor array). Sensor array 240 may also include a microbolometer (e.g., when camera 110 includes a thermal camera or detector).

Sensor array 240 outputs data that is indicative of (e.g., describes properties or characteristics) the radiation (e.g., light) incident on sensor array 240. For example, the data output from sensor array 240 may include information such as the intensity of light (e.g., luminance), color, etc., incident on one or more pixels in sensor array 240. The light incident on sensor array 240 may be an "image" in that the light may be focused as a result of lenses 230. Sensor array 240 can be considered an "image sensor" because it senses images falling on sensor array 240. As the term is used herein, an "image" includes the data indicative of the radiation (e.g., describing the properties or characteristics of the light) incident on sensor array 240. Accordingly, the term "image" may also be used to mean "image sensor data" or any data describing an image. Further, a "pixel" may mean any region or area of sensor array 240 for which measurement(s) of radiation are taken (e.g., measurements that are indicative of the light incident on sensor array 240). A pixel may correspond to one or more (or less than one) sensor(s) in sensor array 240.

Signal processor 250 performs signal processing operations on image data captured by sensor array 240. Controller 260 may control the operation of signal processor 250 as well as the rest of camera 110. Controller 260 (e.g., in conjunction with signal processor 250) may perform signal processing on images, such as object recognition. Operation of controller 260 and/or signal processor 250 is described below in greater detail.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 260 may perform functions described as performed by signal processor 250 and vice versa.

Figure 3:
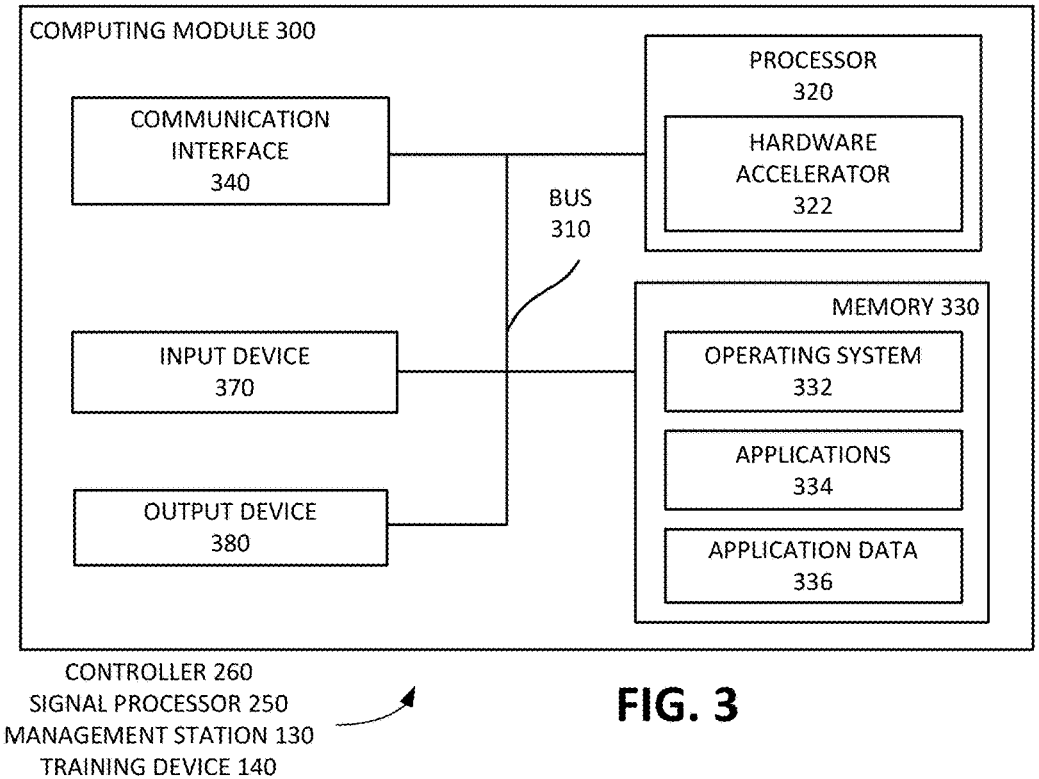
FIG. 3 is a block diagram of exemplary components of a computing module in one embodiment.

FIG. 3 is a block diagram illustrating exemplary components of a computing module 300 in one embodiment. Controller 260 and/or signal processor 250 in camera 110 may include a computing module 300. Management station 130 and training device 140 may also include a computing module 300. As shown in FIG. 3, computing module 300 may include a bus 310, a processor 320, a memory 330, and a communication interface 340. In some implementations, computing module 300 may also include an input device 370 and an output device 380.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), field-programmable gate array (FPGA), and/or another type of integrated circuit or processing logic. Processor 320 may include a hardware accelerator 322, such as a graphical processing unit (GPU). In some embodiments hardware accelerator 322 may include an ASIC, an FPGA, another type of integrated circuit, one or more specialized integrated circuits (e.g., with hardwired digital and/or analog circuits), etc. Hardware accelerator 322 may be implemented on a different chip than processor 320 or as a part of processor 320.

Memory 330 may include any type of volatile and/or non-volatile storage device that stores information and/or instructions. Memory 330 may include a random access memory (RAM) or any type of dynamic storage device, a read-only memory (ROM) device or any type of static storage device, a content addressable memory (CAM), a magnetic or optical recording memory device and its corresponding drive, or a removable memory device. Memory 330 may store information and instructions (e.g., applications 334 and operating system 332) and data (e.g., application data 336) for use by processor 320.

Memory 330 may store instructions for execution by processor 320 and/or hardware accelerator 322. The software instructions may be read into memory 330 from another computer-readable medium or from another device. The software instructions contained in memory 330 may cause processor 320 to perform processes described herein. Alternatively, hardwired circuitry (e.g., logic) may be used in place of, or in combination with, software instructions to implement processes described herein. Thus, implementations described herein are not limited to any specific combination of hardware circuitry and software.

Operating system 332 may include software instructions for managing hardware and software resources of computing module 300. For example, operating system 332 may include Linux, Windows, OS X, Android, an embedded operating system, etc. Applications 334 and application data 336 may provide network services or include applications, depending on the device in which the particular computing module 300 is found.

Communication interface 340 may include a transceiver (e.g., transmitter and/or receiver) that enables computing module 300 to communicate with other components, devices, and/or systems. Communication interface 340 may communicate via wireless communications (e.g., radio frequency, infrared, etc.), wired communications, or a combination thereof. Communication interface 340 may include a transceiver that converts baseband signals to radio frequency (RF) signals or vice versa and may be coupled to an antenna.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications or a wireless network interface (e.g., a WiFi) card for wireless communications.

Computing module 300 (e.g., controller 260 and/or signal processor 250 in camera 110, managing station 130, and/or training device 140) may perform operations relating to the detection of objects in images and detecting objects in images. For example, training device 140 may determine characterizing features of an object and camera 110 may search images for those characterizing features to identify the object. Computing module 300 (as part of camera 110 or training device 140) may perform these operations in response to processor 320 executing software instructions contained in a computer-readable medium, such as memory 330.

Some devices, such as training device 140 or management station 130, may also include input device 370 and output device 380. Input device 370 may enable a user to input information into computing module 300. Input device 370 may include a keyboard, a mouse, a pen, a microphone, a camera, a touch-screen display, etc. Output device 380 may output information to the user. Output device 380 may include a display, a printer, a speaker, etc. Input device 370 and output device 380 may enable a user interact with applications executed by computing module 300.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4A:
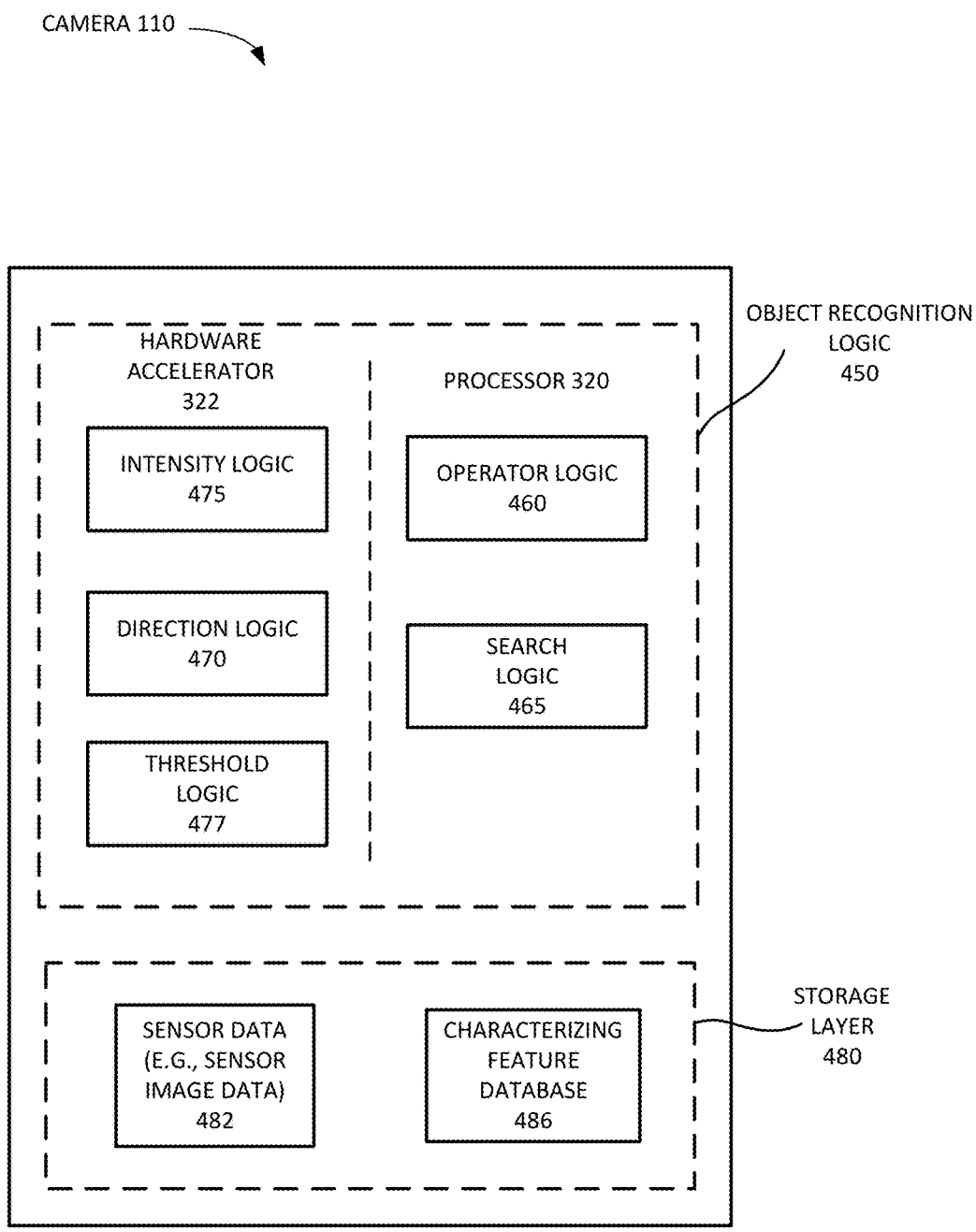
FIG. 4A is a block diagram illustrating exemplary functional components of the camera 110 of FIG. 2.

FIG. 4A is a block diagram illustrating exemplary functional components of camera 110 (e.g., controller 260 and/or signal processor 250). The functional components of camera 110 may be implemented, for example, in a computer module 300 (i.e., processor 320 and/or hardware accelerator 322 executing instructions (e.g., applications 334) using data (e.g., application data 336) from memory 330).

As shown in FIG. 4A, camera 110 may include object recognition logic 450 and storage layer 480. Object recognition logic 450 operates on image sensor data (e.g., as input) and performs object recognition (e.g., determines if the image data includes features associated with an object). Storage layer 480 may employ memory 330 and object recognition may employ processor 320 and/or hardware accelerator 322. Object recognition logic 450 uses storage layer 480 to store image data 482 and characterizing features database (DB) 486 associated with objects. Object recognition logic 450 may employ operator logic 460, direction logic 470, intensity logic 475, and threshold logic 477 to detect features in an image data, as described below. Camera 110 may also use search logic 465 to systematically search through an image or video for features and/or objects.

Figure 5A:
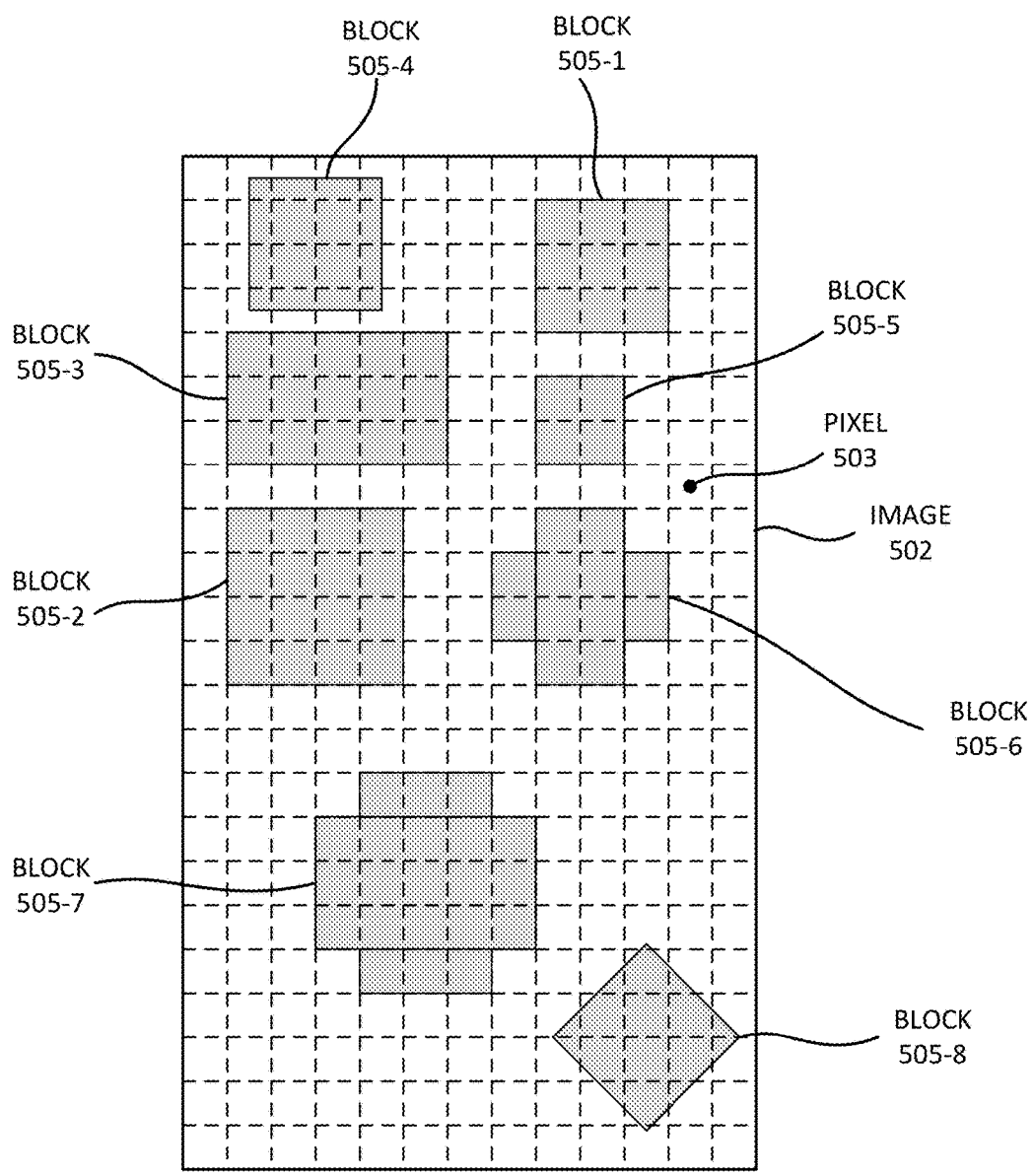
FIG. 5A illustrates an exemplary portion of an image with pixels.

As discussed above, object recognition logic 450 operates on image data (e.g., as input). FIG. 5A illustrates an exemplary image 502 (or a portion 502 of an image) represented with pixels 503 (singularly "pixel 503"). Object recognition logic 450 may perform calculations on image 502. In this example, image 502 includes 299 pixels (i.e., a 13 pixel by 23 pixel rectangle). Image 502 (or a portion 502 of an image) may be larger or smaller. The dashed lines in FIG. 5A correspond to boundaries between pixels 503.

Pixel 503 may correspond to any region or area of sensor array 240 for which measurement(s) of radiation are recorded (e.g., measurements that are indicative of the light incident on sensor array 240). Pixel 503 may also correspond to one or more (or less than one) sensor(s) in sensor array 240. Pixel 503 may correspond to a single-color sensor region. Pixel 503 may correspond to a full-color region extrapolated from one or more single-color sensors. That is, pixel 503 may be an abstraction of raw image data captured by sensor array 240.

Pixel 503 may also correspond to the addressable unit (e.g., smallest addressable unit) of image data on which hardware accelerator 322 (or other circuitry that performs the operations discussed herein) is optimized to perform operations. In one embodiment, hardware accelerator 322 may be optimized to perform calculations (e.g., rendering calculations) on single-color sensor data, which may require more processing than full-color (e.g., extrapolated pixels), but such an optimization may increase object recognition performance. In this case (which may be referred to as subpixel analysis), hardware accelerator 322 may use knowledge of sensor geometry to manipulate colored subpixels separately.

Returning to FIG. 4A, object recognition logic 450 may employ logic for supporting an "operator" that may quantize, describe, or define a feature in an image, such as image 502. An operator is a process (e.g., a calculation, determination, or logical construct) occurring over one or more pixels within one or more area(s) of image 502. Logic supporting the operator may be referred to as operator logic 460. Operator logic 460 may use "blocks" (e.g., an area of an image) in the process of quantizing a feature. As shown in FIG. 5A, blocks 505 define an area of image 502. The area defined by blocks 505 may cover more than one pixel 503, less than one pixel 503, and/or may cover only part of an area associated with a pixel 503. For example, block 505-1 is an area of image 502 that covers nine whole pixels 503 (i.e., a three-by-three square). Block 505-2 is an area of image 502 that covers sixteen whole pixels 503 (i.e., a four-by-four square). Block 505-3 is an area of image 502 that covers fifteen whole pixels 503 (i.e., a three-by-five rectangle). Block 505-4 is an area of image 502 that covers four whole pixels 503 and part of twelve other pixels 503. Block 505-5 is an area that covers four whole pixels 503 and no part of any other pixel 503. Block 505-7 is an area that is symmetrical and is centered over the center of a pixel. Block 505-8 is an area that is square, but includes edges that are not vertical or horizontal relative to the underlying grid of pixels 503. Block 505-8 is an example of a block that is not "straight." As the term is used herein, a "straight" block is a block that includes edges that are all horizontal or vertical (e.g., relative to the underlying grid of pixels 503). The other blocks shown in FIG. 5A (i.e., blocks 505-1 through 505-7) are examples of blocks that are straight.

In some implementations, hardware accelerator 322 is more optimized to perform calculations on some types of blocks 505 than other types of blocks 505. For example, hardware accelerator 322 may be optimized to perform calculations on square blocks centered over a pixel and/or covering whole pixels, such as block 505-1 and block 505-2. Hardware accelerator 322 may be optimized to perform calculations on blocks covering whole pixels, such as block 505-1, block 505-2, block 505-3, and block 505-5 (e.g., whether or not the block is centered over the center of a pixel 503). In one embodiment, hardware accelerator 322 may be optimized to perform calculations on blocks that are symmetrical, such as block 505-6 and block 505-7. In one embodiment, hardware accelerator 322 may be optimized to perform calculations on symmetrical blocks that are centered over the center of pixel, such as block 505-7.

In one embodiment, hardware accelerator 322 may be less optimized to perform calculations on non-square blocks (such as block 505-3) and/or blocks that only partially cover areas associated with a pixel (such as block 505-4). In one embodiment, hardware accelerator 322 may be more optimized to perform calculations on blocks with an odd number of pixels (such as block 505-1) as compared to blocks with an even number of pixels (such as blocks 505-5 and 505-2). Alternatively, hardware accelerator 322 may be more optimized to perform calculations on blocks with an even number of pixels (such as block 505-5) as compared to blocks with an odd number of pixels (such as block 505-1). In one embodiment, hardware accelerator 322 may be optimized to perform calculations on a block regardless of whether the block has an even or an odd number of pixels.

Hardware accelerator 322 may also be less optimized to perform calculations on a block that is not "straight" (e.g., a block that has an edge that is not vertical or not horizontal relative to pixels 503) as compared to a straight block.

Because hardware accelerator 322 may be more optimized, for example, to perform calculations on blocks that cover whole pixels and/or blocks that are straight, the process of moving, positioning, placing, and/or rotating a block may result in a less optimized block (e.g., a non-straight block or a block that does not cover whole pixels, even though the rotated block is still square). In some cases, if a block is moved, placed, positioned, or rotated (e.g., other than by 90° or a multiple thereof), the resulting block may not be considered "straight" because the resulting block would not have an edge that is not horizontal or vertical. In other words, in some instances placing, positioning, or rotating a block that is optimized for hardware accelerator 322 may result in another block that is also optimized for hardware accelerator 322. Hardware accelerator 322 may have all, none, or any combination of the optimizations listed above.

Figure 5B:
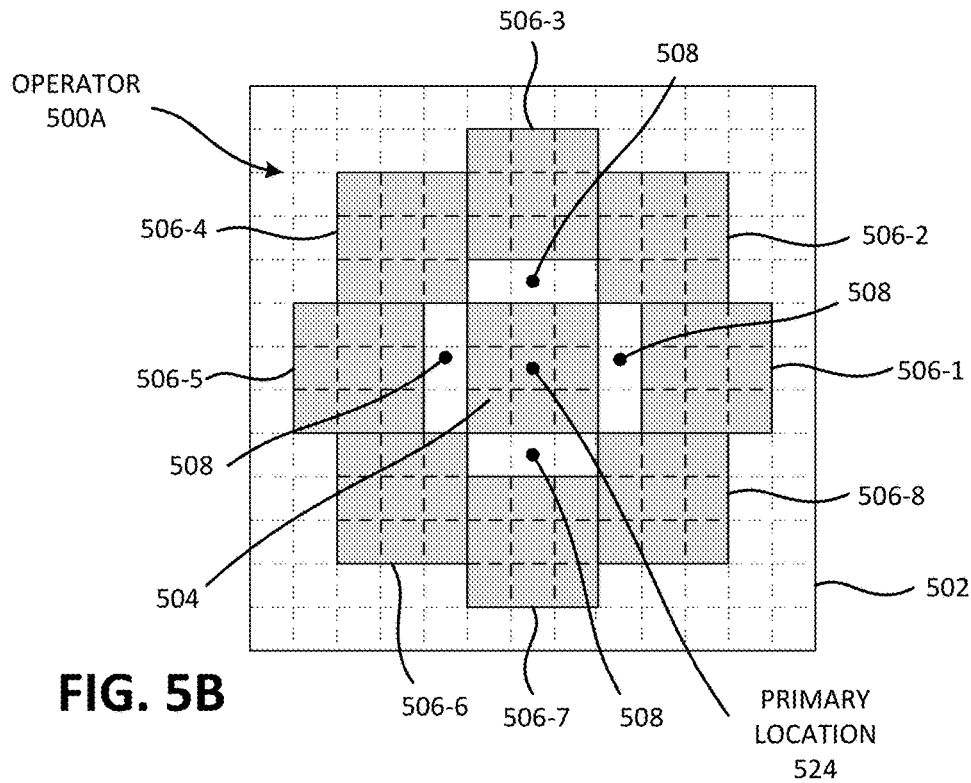
FIG. 5B illustrates an exemplary operator in one embodiment.

FIG. 5B is a diagram of an exemplary operator 500A in one embodiment. Object recognition logic 450 may employ operator 500A when defining a feature in an image. Operator 500A is shown superimposed on a portion 502 of an image. Operator 500A includes a primary block 504 and several (e.g., eight or any number) outer blocks 506 (outer block 506-1 through block 506-8). As with FIG. 5A, the dashed lines correspond to boundaries between pixels of the underlying image, which includes 169 pixels (a 13×13 square) in the example of FIG. 5B. Outer blocks 506 surround primary block 504. In the current example, outer blocks 506 are all the same size (e.g., covering nine pixels). Also, primary block 504 is the same size as outer blocks 506 (e.g., nine pixels) in this example. Other operators may include a different number of outer blocks 506 (e.g., 2, 4, 16, 32, or any integer number).

Primary block 504 and/or outer blocks 506 encompass, include, or cover an area of a number of pixels (e.g., one or more than one). As shown with operator 500A, primary block 504 in operator 500A includes nine pixels (as identified by dashed lines). Outer blocks 506 also include nine pixels each. In one embodiment, primary block 504 and/or outer block 506 (e.g., each of outer blocks 506) each include an odd number of pixels greater than one. The number of pixels in each of outer blocks 506 may be identical (e.g., an odd number greater than one). Further, the number of pixels in primary block 504 may be the same as the number of pixels in outer blocks 506 (e.g., an odd number greater than one). In another embodiment, primary block 504 and/or outer block 506 may include an even number of pixels greater than four (e.g., six, eight, etc.). In another embodiment, primary block 504 and/or outer block 506 includes an odd number pixels greater than one or an even number of pixels greater than four. That is, primary block 504 and/or outer block 506 includes three or more than four pixels (e.g., three, five, or more than five).

As shown in operator 500A, the image includes (i.e., the image data describes) pixels 508 lying between primary block 504 and at least one of outer blocks 506. For example, pixels 508 lie between primary block 504 and outer block 506-1, between primary block 504 and outer block 506-3, between primary block 504 and outer block 506-5, between primary block 504 and outer block 506-7. Although less apparent, one or more pixels 508 may also lie between primary block 504 and the other outer blocks 506 (i.e., outer block 506-2, outer block 506-4, outer block 506-6, and outer block 506-8).

Figure 5C:
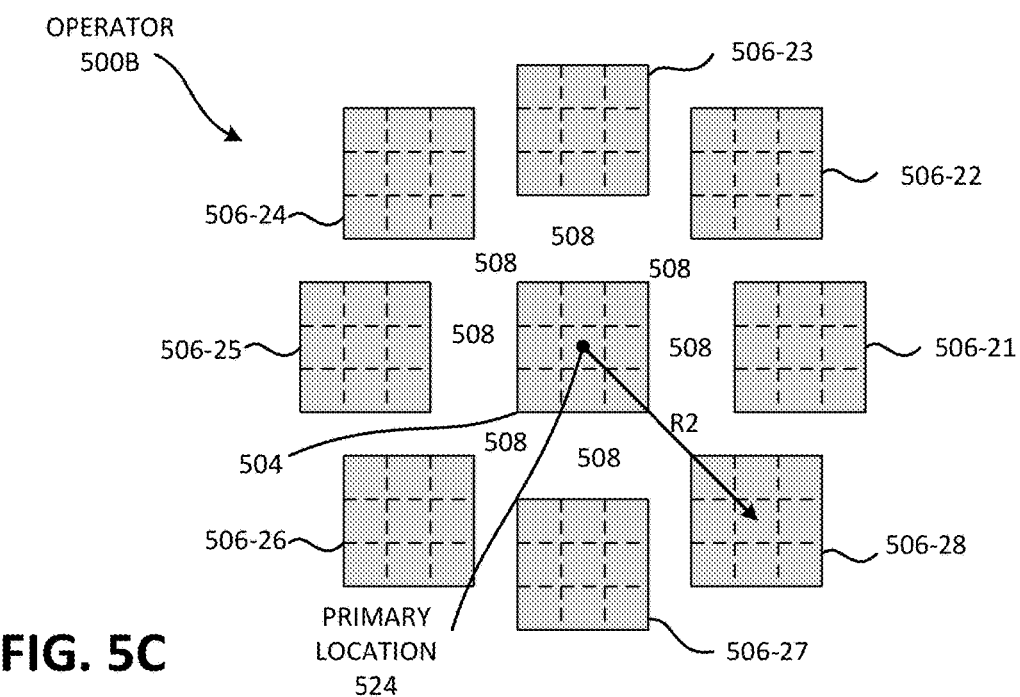
FIG. 5C illustrates an exemplary operator in another embodiment.

Pixels 508 lying between primary block 504 and outer blocks 506 is more apparent in other examples and configurations of an operator. For example, FIG. 5C illustrates an exemplary operator 500B in another embodiment. Operator 500B is shown superimposed on a portion of an image (such as image 502, which is not shown in FIG. 5C). Like operator 500A, operator 500B includes primary block 504 and several (e.g., eight or any number) outer blocks 506. The image behind operator 500B (i.e., described by image data) includes pixels 508 lying between primary block 504 and each of the outer blocks 506. That is, outer blocks 506 may be spaced from primary block 504 such that at least one (or more) of outer blocks 506 is a distance from primary block 504 to avoid primary block 504 from being contiguous with the outer block 506. For convenience, pixels 508 lying between blocks 504/506 are referred to as "omitted" or "external" pixels 508. On the other hand pixels lying within blocks 504/506 are referred to as "included" or "internal" pixels.

In other embodiments, primary block 504 may be a different size than one or more outer blocks 506 and/or outer blocks 506 may be a different size than each other. In other embodiments, blocks 504/506 may include one pixel or an even number of pixels greater than one. These other embodiments, however, may not necessarily be the best for maximizing the performance of hardware accelerator 322 (depending on the architecture of hardware accelerator 322). Hardware accelerator 322 may be optimized for these other embodiments, however. If the number of pixels in block 504/506 is even and the block is square, then the block may cover a whole number of pixels (e.g., be moved or placed such that the block is centered evenly between four pixels such as block 505-5). In some embodiments, as described in more detail below, whether the number of pixels in outer blocks 506 is even or odd may depend on the size of the operator. For example, a larger operator may have an even number of pixels in outer blocks 506; and a smaller operator may have an odd number of pixels in outer blocks 506. In other embodiment, block 504/506 may not be straight in that the block has an edge that is not horizontal or vertical with respect to pixels 503.

Thus, operator 500A and 500B are examples of operators that operator logic 460 may use to quantize a feature in an image. As described below in more detail, before quantizing a feature, operator logic 470 may alter, move, snap, or rotate all or some of the blocks in an operator. Operator logic 470 may alter, move, snap, or rotate all or some of the blocks based on a number of factors (e.g., such as the gradient direction of intensity at the center of primary block 504).

To determine whether and how to alter, move, snap, or rotate all or some of the blocks in an operator (e.g., operator 500A in FIG. 5B), operator logic 460 may employ direction logic 470 for this purpose. Direction logic 470 operates on (e.g., inputs) image data associated with an area of an image (e.g., a block) and may calculate a direction or orientation of an extracted feature, such as the gradient of the intensity at the center of the area of the image. For example, direction logic 470 may input gradient area 520 (see FIG. 5F) of image 502, and output gradient direction 522 about the center of area 520 (e.g., 135°, or in the direction of the center of block 506-4). In these examples, counterclockwise is represented as the positive direction and clockwise is represented as the negative direction. The opposite representation could also (consistency) be used as well. In these examples, zero degrees is considered in the direction of the x axis in a coordinate system with primary location 524 as the origin. Other definitions for the direction of zero degrees are possible.

Figure 5D:
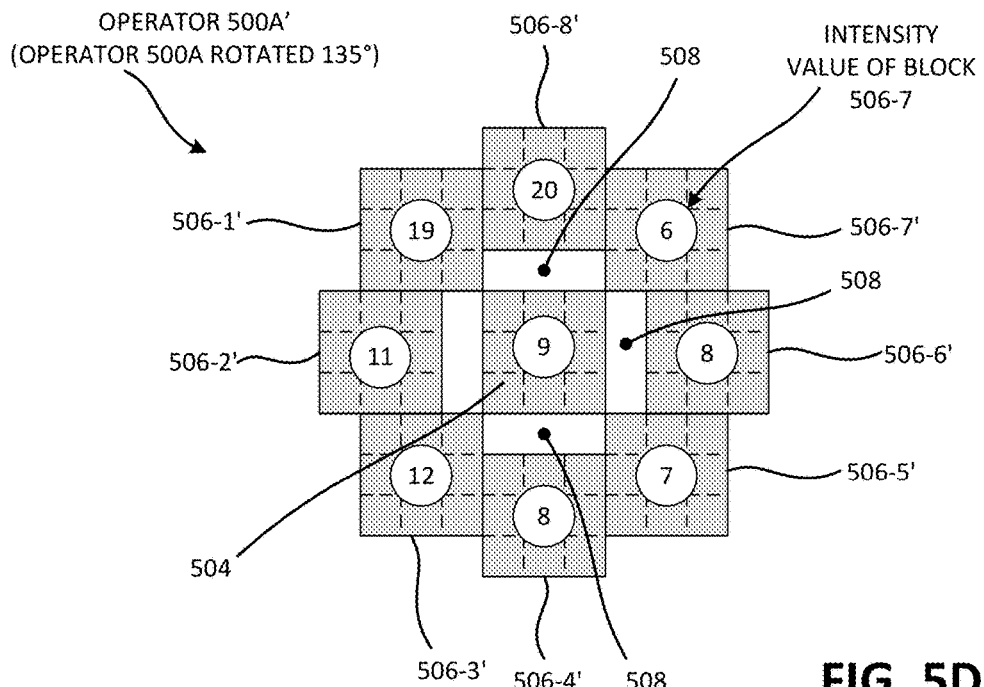
FIG. 5D illustrates the exemplary operator of FIG. 5A associated with average intensity values.
Figure 5E:
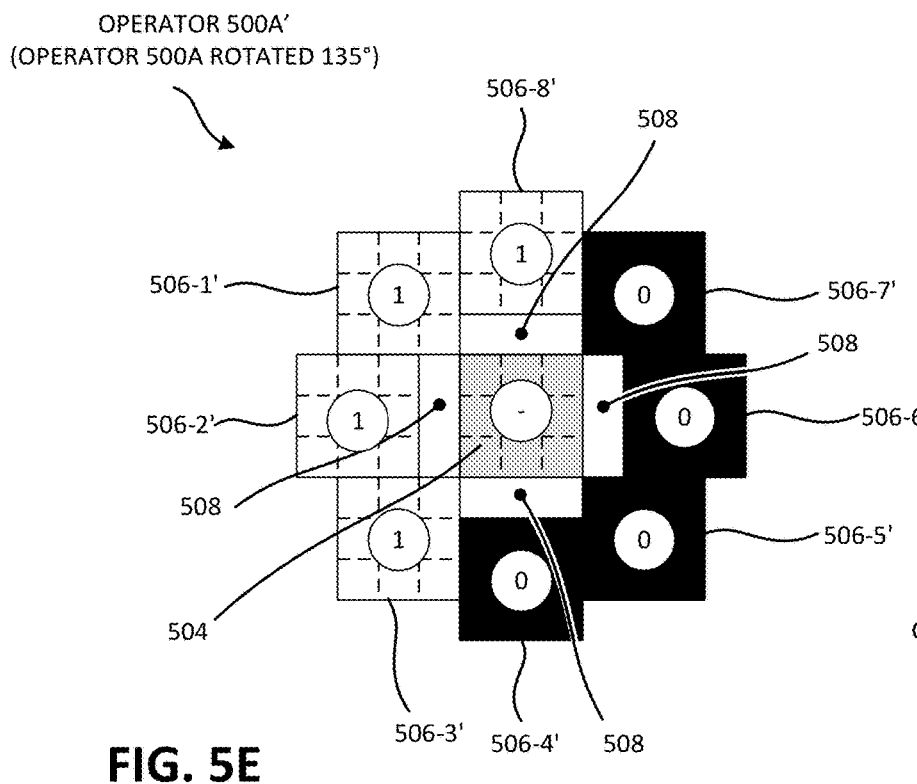
FIG. 5E illustrates the exemplary operator of FIG. 5B associated with binary threshold intensity values.

In this example, area 520 (in white) is larger than primary block 504 (not shown in FIG. 5E). Area 520 also includes pixels 508 (lying between primary block 504 and outer blocks 506) and portions of outer blocks 506. In the case where gradient area 520 is centered on primary block 504, then the center of area 520 is referred to as the primary location 524. That is, primary block 504 may encompass primary location 524 (e.g., the center of primary block 504). Thus, operator logic 460 may quantify the direction by determining the gradient direction of intensity of the image at the primary location. As described in more detail below, operator logic 460 may arrange blocks (e.g., outer blocks 506) based on direction logic 470.

In one embodiment, direction logic 470 may blur the gradient area 520 around its center. To obtain a more stable direction, direction logic 470 may determine more than one gradient direction (e.g., centered at slightly different locations near primary location 524). Once a sufficient number of gradient directions are determined, direction logic 470 may average them to obtain a more stable gradient direction for use by operator logic 460. In one embodiment, the gradient direction is calculated by determining the finite differences (e.g., differences in intensity values) in gradient area 520. In this embodiment, direction logic 470 may calculate many finite differences between neighboring pixels in the relevant area around the center of the operator. These calculations (e.g., finite differences) may be stored in a histogram (e.g., a data structure representative of a histogram). Direction logic 470 may determine a peak at a certain bin (e.g., a certain finite difference) that corresponds to an angle interval (e.g., an approximate angle corresponding to direction). In one embodiment, the gradient area 520 is blurred before calculating the gradients (e.g., finite differences) to determine a more stable direction (e.g., distinct peak in the histogram). Other ways to perform the gradient calculation are possible.

Further, other ways of calculating a direction or orientation are possible. For example, a direction or orientation may be based on color. The method of determining the gradient direction may be based on the feature of object being detected. That is, some objects and features may lend themselves better to an orientation based on color rather than intensity alone.

For increased performance, direction logic 470 may be implemented in hardware accelerator 322. If implemented in hardware accelerator 322, intensity logic 475 may be optimized to perform calculations on blocks centered on a whole pixel. Intensity logic 475 may be optimized to perform calculations on blocks that are square. Hardware accelerator 322 may also be optimized to perform calculations on blocks that only include whole pixels and do not include portions of whole pixels. Hardware accelerator 322 may be optimized to perform calculations on blocks having an odd number of pixels. In another embodiment, direction logic 470 may alternatively be implemented in pure silicon (e.g., hardwired in a chip), on a dedicated specialized processor, in an ASIC, in an FPGA, with hardwired circuit components, with digital and/or analog circuits, in software, or a combination of software and hardware.

As noted, operator logic 460 may determine the position, location, or layout of primary block 504 and outer blocks 506. In one embodiment, operator logic 460 may position outer block 506 (or each of the outer blocks 506) and/or primary block 504 so as to be centered on a pixel (e.g., "snapping" a block on a pixel). In one embodiment, operator logic 460 shapes outer block 506 (or each outer block 506) to be a square (that is, with the same whole number of pixels in height and width) and/or to have an odd number of pixels. Operator logic 460 may also shape block 504/506 such that it is square and centered on a pixel (and operator logic 460 may do so for each block 506). In one embodiment, operator logic 460 ensures that one or more of the blocks in an operator remain straight (e.g., by not rotating the block about the block's own origin) or are oriented to be straight.

Operator logic 460 may determine the locations of outer blocks 506 surrounding primary block 504 by spacing outer blocks 506 at a distance (or radius) from primary block 504. In one embodiment, outer blocks 506 are distributed around primary block 504 such that each of outer blocks 506 is centered on a pixel. In one embodiment, operator logic 460 may determine the locations of outer blocks 506 surrounding primary block 504 by spacing outer blocks 506 at a distance from primary block 504 to avoid primary block 504 from being contiguous with at least one of outer blocks 506. In one embodiment, operator logic 460 may space outer blocks 506 around primary block 504 such that outer blocks are equidistant or approximately equidistant.

Snapping or otherwise positioning outer blocks 506 such that outer blocks 506 are centered on a pixel may result in some (e.g., at least two) of outer blocks 506 overlapping so as to include and the same pixel (e.g., a common internal or included pixel). In some instances, overlapping may occur without snapping. For example, an operator may have a small radius (or outer blocks 506 and/or primary block 504 may be large enough) such that outer blocks 506 overlap with each other and/or primary block 504 (so as to include the same pixel). In these cases, when operator logic 460 calculates a value indicative of the intensity of two such outer blocks 506 (as described in more detail below), the intensity of those two outer blocks 506 may be based on the intensity of that same pixel (e.g., the common internal pixel). In addition, operator logic 460 may determine the locations of outer blocks surrounding the primary block based on the gradient direction. In other words, operator logic 460 uses the gradient direction to determine the location of the outer blocks.

Figure 7A:
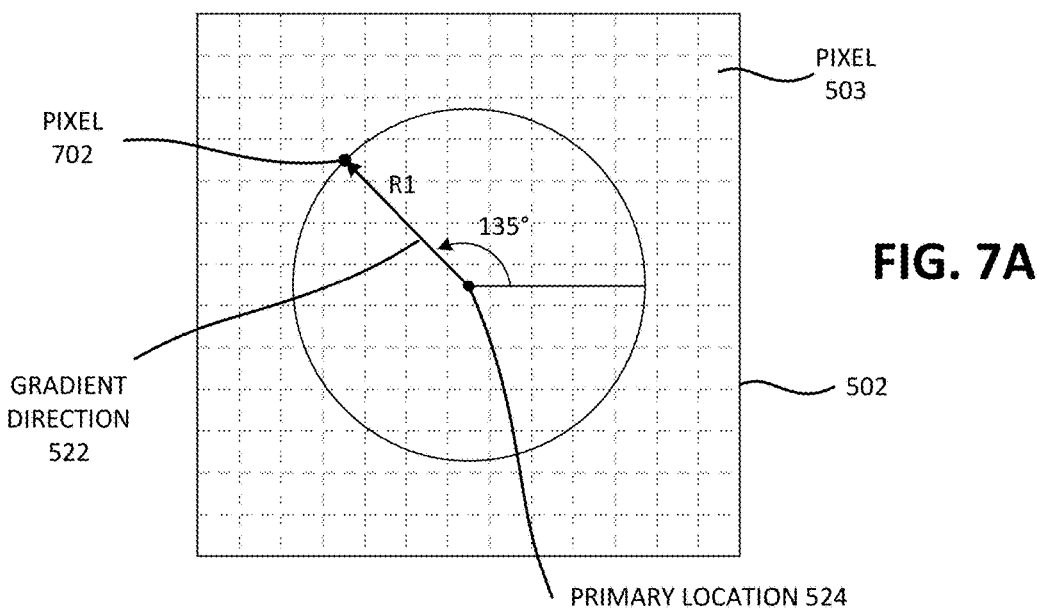
FIG. 7A illustrates the determination of a gradient direction according to one embodiment.

As described in more detail below, working with operator 500A and a gradient direction of 135° (determined by direction logic 470, for example) operator logic 460 may rotate operator 500A by 135°. FIG. 7F is a diagram of an exemplary operator 700F, which is operator 500A rotated by 135°. In this example, primary block 504 and outer blocks 506 (of operator 500A) are rotated 135° about primary location 524 (to result in operator 700F). As shown in FIG. 7F, for example, outer blocks 506-1 through 506-8 (shown as outer blocks 716-1 through 716-8, respectively) are in different locations based on the rotation. Although primary block 504 (shown as primary block 704 in FIG. 7F) has the same center at primary location 524, it has also been rotated and is no longer straight in that it includes an edge that is not horizontal or vertical relative to the underlying pixels 503 of image 502. Likewise, outer blocks 716 are also not straight relative to the underlying pixels 503 of image 502. As noted, however, the location of outer blocks 716 and primary block 704 may be less than optimal for some hardware (although certainly useful in some circumstances and potentially optimized for other hardware). Accordingly, operator logic 460 may move, snap, rotate, and/or alter some blocks in operator 700F.

As noted, because the blocks in operator 700F are not straight, operator 700F may not be optimized for some hardware accelerators 322. Accordingly, the blocks in operator 700F may be snapped (e.g., to the center of a pixel) and straightened (e.g., rotated about the center of the particular block). FIG. 5D illustrates an exemplary operator 500A', which like operator 700F is operator 500A rotated 135° but with snapped and straight blocks. In this example, primary block 504 and outer blocks 506 (of operator 500A) are rotated 135° about primary location 524. As shown in FIG. 5D, however, blocks 506-1 through block 506-8 (shown as blocks 506-1' through 506-8', respectively) are not only in different positions but have been snapped and straightened (as compared to operator 700F). Further primary block 504' has also been straightened (as compared to primary block 714). Another way to consider operator 500A' as compared to operator 500A is that primary block 504 has not been rotated and that although the center position of outer blocks 506 have been rotated about primary location 524, the orientation of outer blocks 506 have not been altered. Accordingly, the term "snapping" may also include ensuring that the snapped block remains or becomes straight.

Figure 8:
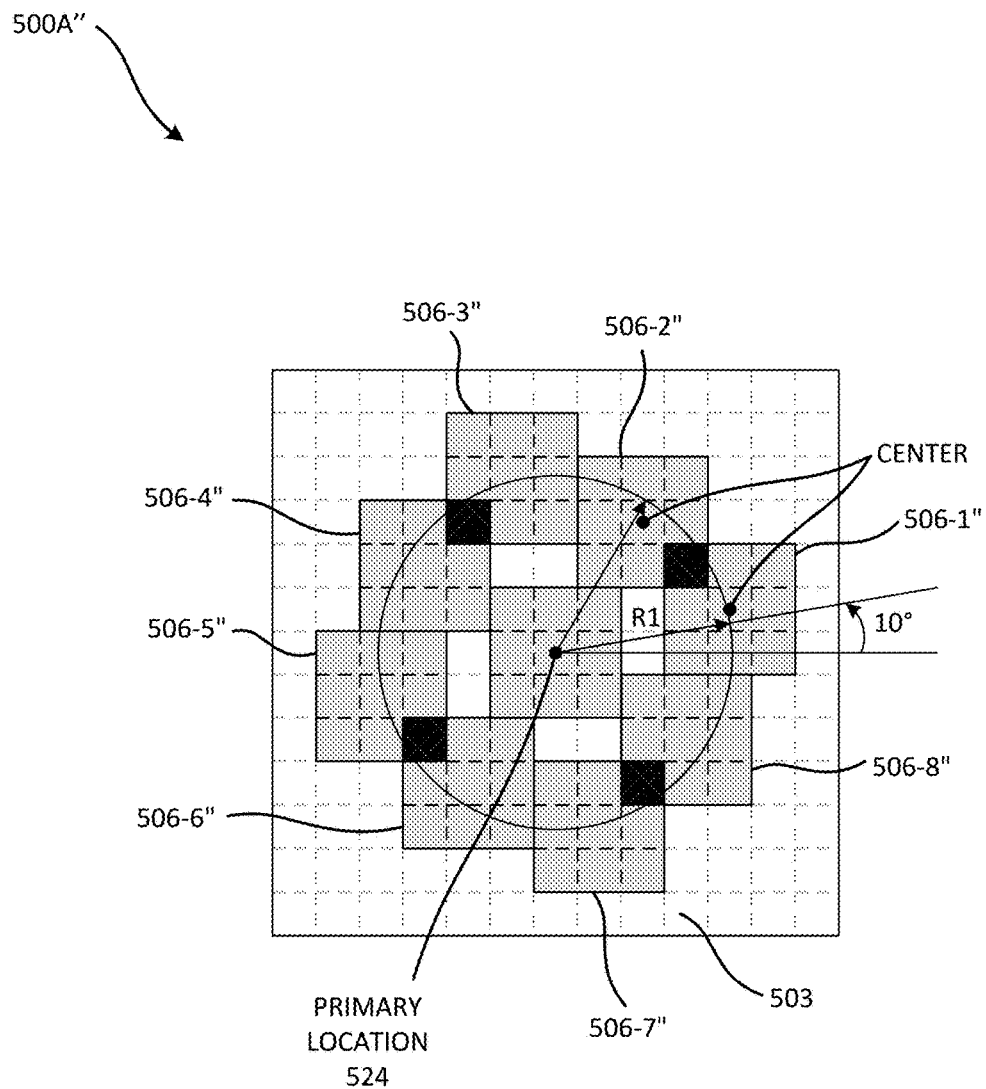
FIG. 8 illustrates an exemplary operator in another embodiment.

Because the gradient direction in the example of operator 500A' is 135°, the rotated operator 500A' is substantially similar if not the same as operator 500A. If the gradient direction is 10°, however, then the rotated operator would be different. FIG. 8 illustrates an exemplary operator 500A", which is operator 500A rotated 10° with snapped and straight blocks. With operator 500A" outer blocks 506 include overlapping pixels (e.g., a common internal pixel).

Returning to FIG. 4A, once the location of primary block 504 and outer blocks 506 are determined (e.g., possibly after operator logic 460 rotates all or some of the blocks), operator logic 460 may employ intensity logic 475, and threshold logic 477 to quantify a feature in image 502 based on the location of blocks 504 and 506. As an example, assume that operator logic 460 uses operator 500A' in FIG. 5D to quantize a feature of the underlying image. With operator 500A', outer blocks 506-1' through 506-8' correspond to blocks 506-1 through 506-8, but rotated 135° and snapped (and kept straight). Likewise, primary block 504' corresponds to block 504 (but kept straight).

In one embodiment, operator logic 460 employs intensity logic 475 to determine a value indicative of the intensity (e.g., average intensity) of a block, such as primary block 504' or outer block 506'. Intensity logic 475 operates on the image data associated with a block (e.g., as input) and may calculate the value indicative of the average intensity of the image corresponding to the block. For example, intensity logic 475 may input the image data associated with primary block 504' (see FIG. 5D) and output the average intensity of the pixels in primary block 504'. As shown in FIG. 5D, intensity logic 475 outputs the value of '9' as the average intensity of the image data associated with primary block 504' (shown as '9' in a circle superimposed on primary block 504'). Likewise, intensity logic 475 may input the image data associated with outer blocks 506-1' through 506-8' and output the following values: 19, 11, 12, 8, 7, 8, 6, and 20, respectively (shown as the intensity values in circles superimposed on the respective outer blocks 506' in FIG. 5D).

In this example, because pixels 508 lie between primary block 504' and outer blocks 506', pixels 508 do not contribute to the value indicative of the average intensity of primary block 504' and/or do not contribute to the value indicative of average intensity of outer blocks 506'. In other words, in one embodiment an external or omitted pixel 508 does not contribute to the average intensity (or the value indicative of the average intensity) of any block (e.g., primary block 504' or outer blocks 506'). That is, intensity logic 475 does not calculate or determine the value indicative of the average intensity based on an external or omitted pixel 508. On the other hand, intensity logic 475 does calculate or determine the value indicative of the average intensity based on included or internal pixels (e.g., covered by primary block 504 or outer block 506).

For increased performance, intensity logic 475 may be implemented in hardware accelerator 322. If implemented in hardware accelerator 322, intensity logic 475 may be optimized to perform calculations on blocks centered on a pixel (e.g., centered on the center of a pixel). Intensity logic 475 may be optimized to perform calculations on blocks that are square and/or straight. Hardware accelerator 322 may also be optimized to perform calculations on blocks that only include whole pixels and do not include portions of whole pixels. Hardware accelerator 322 may be optimized to perform calculations on blocks having an odd number of pixels. Hardware accelerator 322 may also be optimized to perform calculations on blocks that are symmetrical about a point. Operator logic 460 (and/or operator logic 420 described below) may select block shapes and sizes according to these optimizations (e.g., blocks centered on the center of a pixel; blocks that are square or rectangular; blocks that include whole pixels and do not include portions of whole pixels; blocks having an odd number of pixels; blocks that are symmetrical about a point). In another embodiment, intensity logic 475 may not be implemented in hardware accelerator 322.

In one embodiment, intensity logic 475 may alternatively be implemented in pure silicon (e.g., hardwired in a chip), on a dedicated specialized processor, in an ASIC, in an FPGA, with hardwired circuit components, with digital and/or analog circuits, in software, or a combination of software and hardware. For increased performance, intensity logic 475 may output the sum of the intensities of the pixels (rather than the average). This embodiment may be used, for example, when block 504' is the same size as each of outer blocks 506'. In this case, the sum of the intensities of the pixels is still indicative of the average because the sum is a scaled average and all the blocks are scaled similarly. Whether intensity logic 475 outputs the sum or average (or a different value indicative of the average) may not affect the outcome of operator logic 460.

Operator logic 460 may employ threshold logic 477 to quantize a feature in an image. Threshold logic 477 operates on the intensity values (e.g., value indicative of average intensity values) of primary block 504 and outer blocks 506 (e.g., as input) and compares the values. Threshold logic 477 may compare the intensity value of primary block 504' with each of the intensity values of outer blocks 506'. In one embodiment, if the intensity value of an outer block 506' is greater than primary block 504', then threshold logic 477 outputs and associates one value or symbol (e.g., a '1') with the corresponding outer block. On the other hand, if the intensity value of an outer block 506' is less than (or equal to) the intensity value of the primary block 504', threshold logic 477 outputs and associates a different value or symbol (e.g., a '0') with the corresponding outer block. As shown in FIG. 5E, threshold logic 477 associates a '1' with outer block 506-1' (19>9), block 506-2' (11>9), block 506-8' (20>9), and block 506-3' (12>9).

In addition, threshold logic 477 may associate a "tie" between the intensity values (i.e., equal intensity values) with either one or the other value (e.g., a '0' in the above example) as long as threshold logic 477 is consistent in this respect. Threshold logic 477 may use any value, symbol, group of symbols, or representation (e.g., other than '0' and '1') to represent the output of the comparison of intensity values. For example, threshold logic 477 may output other binary values such as TRUE and FALSE or A and B rather than '0' and '1'. In addition, symbols may be interchanged (but should remain consistent). For example, the '0' value and the '1' value may be interchanged (as compared to the example above). In this example, if the intensity value of an outer block 506 is greater than primary block 504, then threshold logic 477 may output and associate a '0' (rather than a '1' in the previous example) with the corresponding outer block. On the other hand, if the intensity value of an outer block 506 is less than (or equal to) the intensity value of the primary block 504, threshold logic 477 may alternatively output and associates a '1' (rather than a '0' in the previous example) with the corresponding outer block.

In one embodiment, threshold logic 477 is implemented in hardware accelerator 322 to increase performance. In another embodiment, threshold logic 477 is not implemented in hardware accelerator 322. If primary block 504 is the same size as each outer block 506, then the output of threshold logic 477 would be the same regardless of whether the intensity values output from intensity logic 475 are averages or sums. In one embodiment, threshold logic 477 may alternatively be implemented in pure silicon (e.g., hardwired in a chip), on a dedicated specialized processor, in an ASIC, in an FPGA, with hardwired circuit components, with digital and/or analog circuits, in software, or a combination of software and hardware.

Threshold logic 477 may generate a number or value (e.g., that characterizes and quantizes the feature) based on the comparison of the average intensity of the primary block to each of the average intensities of the outer blocks. For example, as shown in FIG. 5E, the characteristic number representing the quantized feature is '11100001.' In one embodiment, the most significant bit of the characterizing feature may be the output of threshold logic 477 associated with an arbitrary outer block 506 of the un-rotated operator (e.g., operator 500A), such as outer block 506-1 (e.g., the outer block in the direction of zero degrees). Thus, in this embodiment, the output value associated with block 506-1' in operator 500A' (which corresponds to outer block 506-1 in operator 500A which has been rotated according to the gradient direction) is selected as the most significant bit. The remaining bits may be defined in the positive (i.e., counterclockwise) direction (i.e., outer block 506-2). In an alternative embodiment, the remaining bits may also be defined in the clockwise (i.e., negative) direction.

Search logic 465 may systematically search image data 482 for features of objects, as defined in characterizing feature DB 486. Search logic 465 may calculate, determine, and/or input operators (such as operator 500A) of different sizes and shapes centered in different portions of images or video. When search logic 465 determines that image data 482 includes a feature (or a threshold of features) that match a characterizing feature (in characterizing feature DB 486), then an object is recognized and is noted. Search logic 465 is described in more detail below with respect to FIG. 6.

Figure 4B:
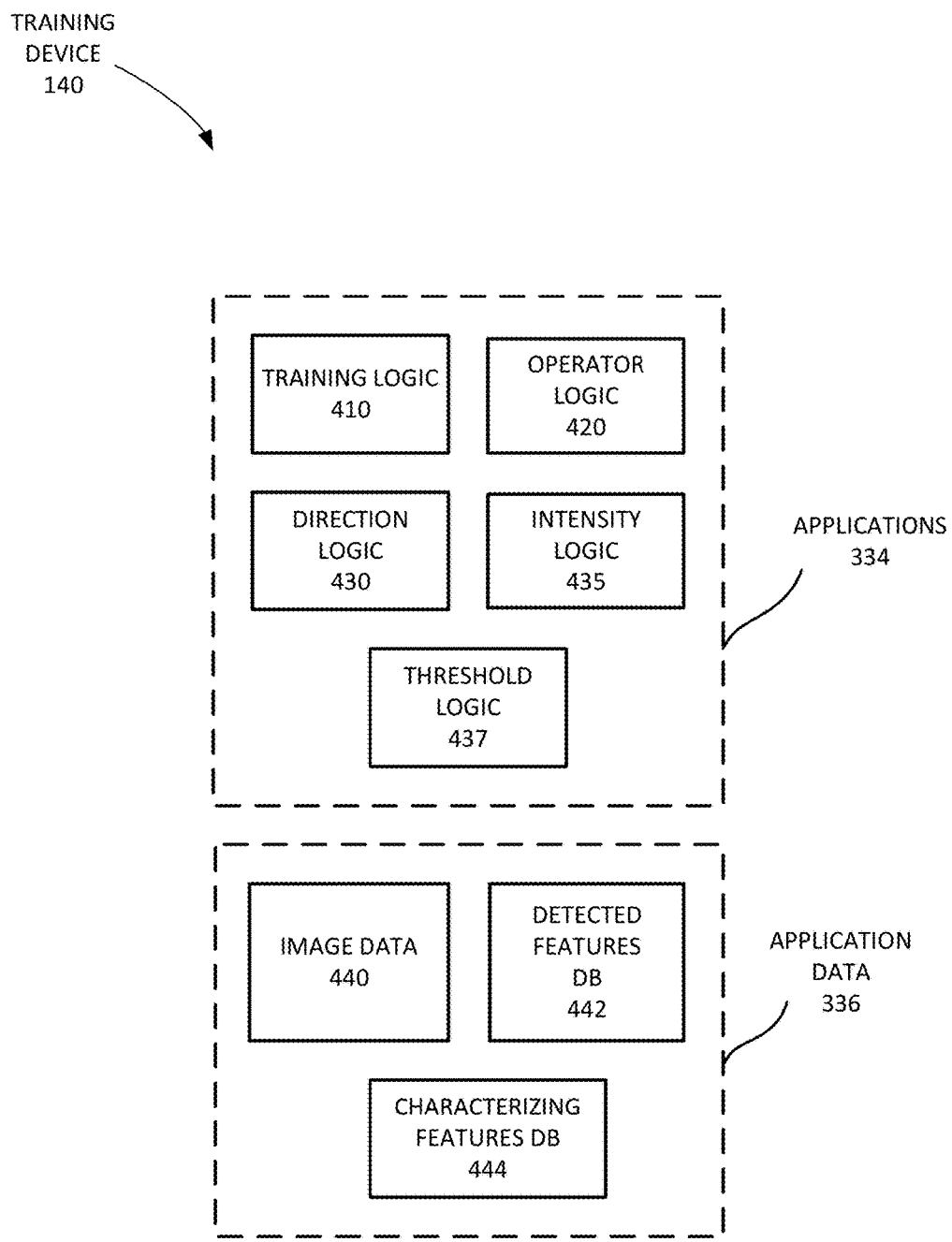
FIG. 4B is a block diagram illustrating exemplary functional components of the training device of FIG. 1B.

FIG. 4B is a block diagram of functional components of training device 140, e.g., applications 334 and application data 336 in training device 140. Applications 334 may include training logic 410, operator logic 420, direction logic 430, intensity logic 435, and threshold logic 437. Application data 336 may include image data 440, detected features DB 442, and characterizing feature DB 444. Applications 334 and application data 336 may include more, fewer, or a different arrangement of components.

Training logic 410 may input many images (e.g., thousands from image data 440) associated with an object and determine features of those images. To determine the features, training logic 410 may employ operator logic 420, direction logic 430, intensity logic 435, and threshold logic 437. Operator logic 420, direction logic 430, intensity logic 435, and threshold logic 437 may be the same as or similar to those corresponding components in camera 110 (e.g., operator logic 460, intensity logic 475, direction logic 470, and threshold logic 477).

Once training logic 410 determines or detects the features, it stores these determined features in detected feature DB 442. If a feature in detected features DB 442 occurs repeatedly, for example, then training logic 410 may store that feature as a characterizing feature associated with the object in characterizing features DB 444. For example, a characterizing feature stored in detected features DB 442 and/or characterizing features DB 444 may be: '11100001' (described with respect to FIG. 5E). In one embodiment, a detected feature may be deemed a characterizing feature with only one occurrence if, for example, only one image is available of the object or feature for training logic 410 to analyze. In another embodiment, training logic 410 determines characterizing features by comparing determined features of an image (or images) known to have an object to determined features of an image (or images) known not to have an object. Determined features repeatedly appearing in the set of images known to have the object, but not appearing in the set of images known not to have the object, may be considered characterizing features.

Characterizing features DB 444 may also associate the name of the object the characterizing feature identifies. Further, characterizing features DB 444 may store the operator (e.g., operator 500A) associated with the feature (e.g., size of primary block 504, the radius associated with the operator, the size and number of outer blocks 506, and/or the size and shape of gradient area 520). Other information stored may include the typical radius, typical gradient direction, and the placement of outer blocks 506 relative to primary block 504. Other information stored may also include the coordinates (location) of the center of the operator (such as primary location 524 of operator 500A) in image 502 (or portion thereof). For example, this location information may identify the expected position of the characterizing feature in an image being searched (e.g., in camera 110). Using this location information, camera 110 may search for a face at the location in the image where a face is expected to appear (e.g., using typical dark-to-bright variations in an image of a face, such as dark spots near eyes and a bright area near the nose). As another example, camera 110 may use the location information to search for license plates at the location in the image where a license plate on a car is expected to appear (e.g., using an operator starting with the typical or expected radius). Camera 110 may further limit a searched area by starting with locations having the typical or expected gradient direction. Likewise, once a license plate is detected (e.g., using a coarse search), camera 110 may search for letters and/or numbers at the location in the image (e.g., using a finer search within the identified license plate) where the letters and numbers are expected to appear. This additional information can reduce the processing load on camera 110 when searching for characterizing features.

As shown, operators (e.g., operator 500A 500B) may have different shapes and sizes. In particular operator 500B has a larger radius than operator 500A. As a result, operator 500B also has more pixels 508 lying between primary block 504 and outer blocks 506. Having the flexibility to use an operator with a suitable (e.g., variable) radius, rather than a fixed or only compact operator, allows operator logic 460 to use (or select) an operator that better matches the corresponding feature or object (e.g., during training). For instance, operator logic 460 may use (or select) an operator with a size that matches the positions of two dark eyes and one bright nose tip (with some variations in between on the operator circle). The intensity between the eye and the nose tip might not be relevant (or characteristic) and may correspond to pixels 508 lying between primary block 504 (e.g., corresponding to the bright nose tip) and outer blocks 506 (e.g., corresponding to the dark eyes). The appropriately sized operator (e.g., 500B) may then be stored in characterizing features DB 444 (in training device 140), transmitted to camera 110, and used as characterizing feature DB 486 to search for those features (corresponding to objects) in images captured by camera 110 (and stored in sensor data 482).

Figure 5F:
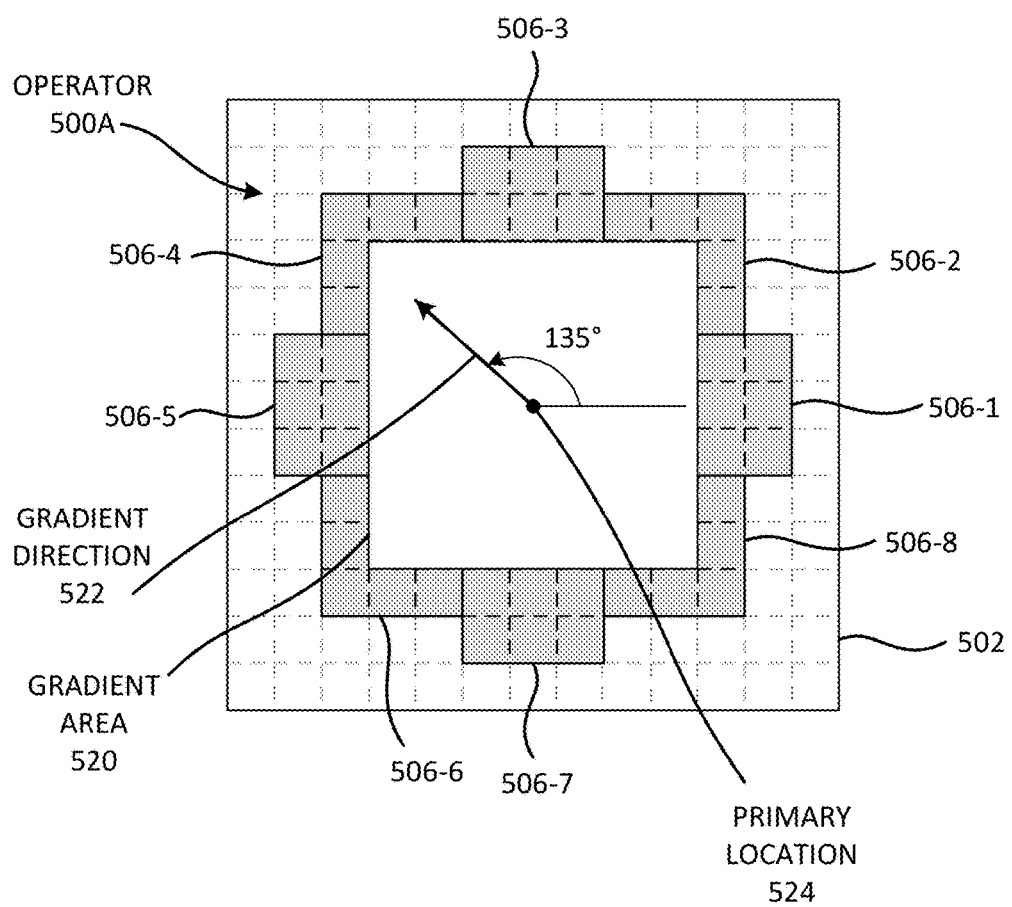
FIG. 5F illustrates the exemplary operator of FIG. 5A with an area for determining a gradient direction.
Figure 6:
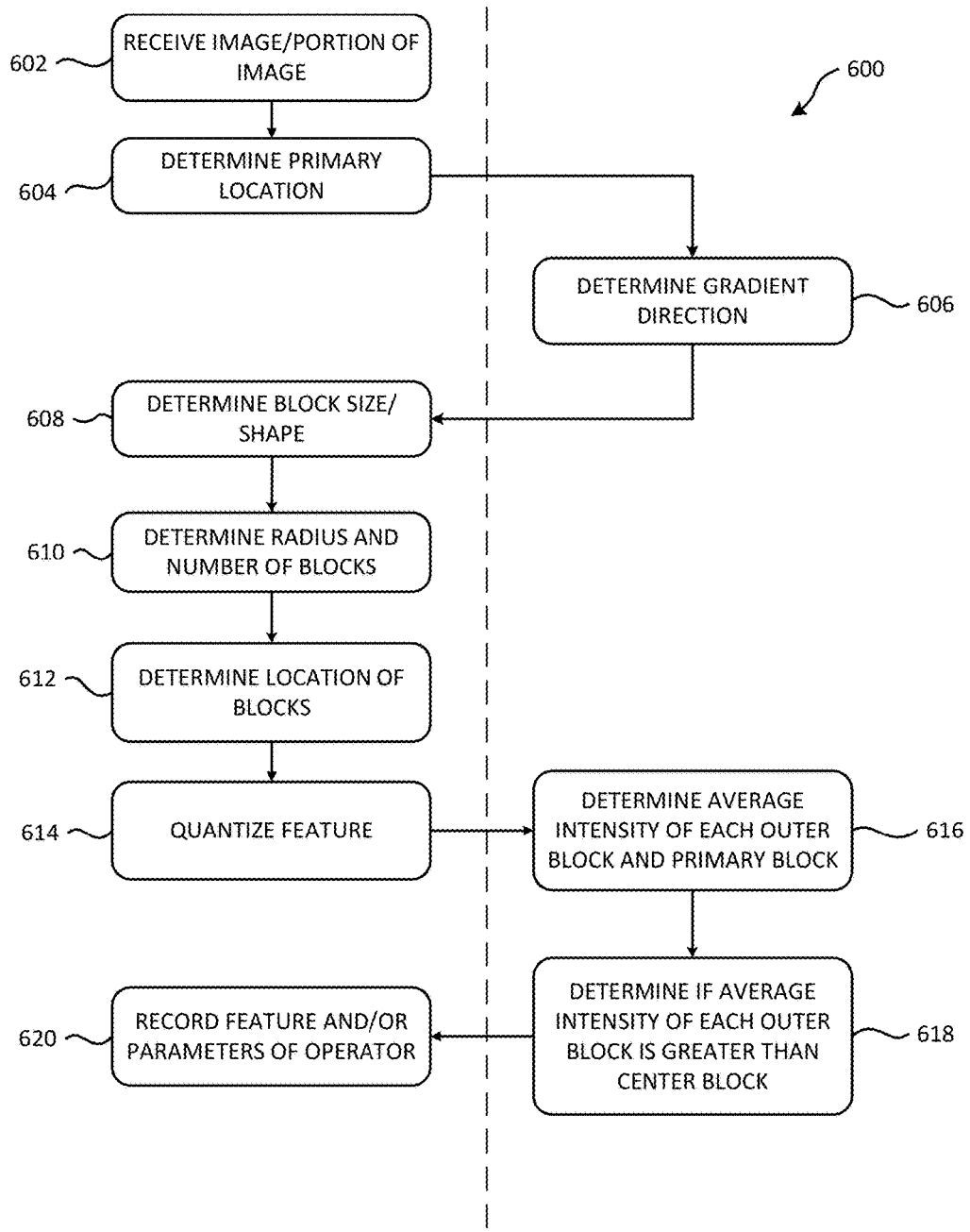
FIG. 6 is a flowchart of an exemplary process for determining an operator for quantizing a feature of an image.

FIG. 6 is a flowchart of an exemplary process 600 for determining an operator and quantizing a feature of an image in one embodiment. Process 600 may be performed in camera 110 (e.g., during a search for a feature) or training device 140 (e.g., during training). In one embodiment, parts of process 600 appearing on the right side of FIG. 6 (e.g., step 606, 616, and 618) are performed by hardware accelerator 322, while the other process blocks are not. In other embodiments, all of process 600 is performed in a general processor (e.g., in software) without the use of hardware accelerator 322. In embodiments that use hardware accelerator 322, more or less may be performed by accelerator 322 than described below. Process 600 is described with respect to operators 500A, 500A', and 500B (e.g., FIGS. 5B through 5F) and FIGS. 7A through 7F.

Process 600 begins with the receipt of an image or a portion of an image (step 602). In this example, operator logic 460/420 receives image portion 502 (see FIGS. 5F and 7A), which may be part of a larger image. In one embodiment, training device 140 receives image portion 502 for training (e.g., to generate characterizing features DB 486). In another embodiment, object recognition logic 450 in camera 110 receives image portion 502 as part of a search to recognize an object. In the discussion of process 600, what is described as being performed by operator logic 460, intensity logic 475, direction logic 470, and threshold logic 477 (in camera 110) may equally apply to operator logic 420, intensity logic 435, direction logic 430, and threshold logic 437 (in training device 140).

The location (e.g., the center or primary location) of a primary block of the operator is determined (step 604). In this example, operator logic 460/420 determines or receives data that identifies the center location of primary block 504. If starting to search an image for a feature (e.g., in camera 110), operator logic 460 may select the center of primary block 504 based on the expected location of the searched-for feature (as stored in characterizing feature DB 444). If continuing to search an image for a feature, operator logic 460 may select the center of primary block 504 based on the next point or pixel in a scan or search of an image. If training (e.g., in training device 140), operator logic 420 may select the primary location of primary block 504 based on the general location (or expected location) of the object in image portion 502 (and may also be based on the next point or pixel in a scan during training). In one embodiment, the primary location may be placed freely within image 502. As shown in FIGS. 5F and 7A, operator logic 460/420 selects (or receives) primary location 524, which corresponds to the center of primary block 504 in operator 500A shown in FIG. 5B. In one embodiment, if primary location 524 is not centered on a whole pixel, the location of primary location 524 may be snapped to the closest center of a pixel.

Process 600 continues with the determination of a direction (e.g., orientation) based on the image data (step 606). In one embodiment, the direction is the direction of the gradient of the intensity of an area of image 502 near the primary location (e.g., near the center of primary block 504). As described herein, the placement or location of outer blocks 506 (e.g., for the determination of the quantized value) may be based on the gradient direction (e.g., an orientation in this case). As such, the gradient direction allows for the operator to be "rotation invariant."

Operator logic 460/420 may rely on direction logic 470/430 to determine the gradient direction. The area of image portion 502 used to determine the gradient direction may be the same or different (e.g., larger or smaller) than the area of primary block 504. In the current example, as shown in FIGS. 5F and 7A, the center of the area used to determine the gradient direction (gradient area 520) may have the same center as the center of primary block 504 (e.g., primary location 524). In the example of FIGS. 5F and 7A, direction logic 470 determines gradient direction 522 about primary location 524 as 135°.

In one embodiment, the shape, location, and size of gradient area 520 may be selected by operator logic 460/420 and/or direction logic 470/430 to optimize the performance of hardware accelerator 322 (or the circuitry performing the functions and operations discussed herein). For example, if the gradient area 520 may be adjusted to be square, straight, rectangular, and/or symmetrical; gradient area 520 may be adjusted to cover whole pixels 503 and not partial pixels; and/or gradient area 520 may be adjusted to cover an even and/or odd number of pixels 503. That is, the center of area 520 may be snapped to be over the center of a whole pixel 503 and/or the size of area 520 may be such that area 520 only covers whole pixels 503. Area 520 may also be selected to be square and/or to cover only an odd number of pixels. In one embodiment, gradient area 520 is as large as the corresponding operator.

Process 600 continues with the determination of the features of an operator, such as a block size and/or shape (step 608) for the operator. The size of primary block 504 and outer blocks 506 may depend on the size of the feature (e.g., the size of the object) being detected, for example. A large feature (relative to the size of a pixel) may have larger block sizes, while smaller features may have smaller block sizes. When training, operator logic 420 may try different block sizes and shapes to find a combination that characterizes a feature well. When searching, operator logic 470 may input the block sizes and shapes (e.g., defining the operator) from characterizing feature DB 486 (as previously determined during training). The size and/or shape of blocks determined (or input) may be any of those discussed herein (e.g., in FIG. 5A).

In the current example, assume that the size of primary block 504 is as shown in FIG. 5B (i.e., nine pixels) for operator 500A. Also assume that the size of each outer block 506 is also as shown in FIG. 5B (i.e., nine pixels) for operator 500A. In this example, the size of primary block 504 is the same as the size of outer blocks 506. If process 600 is being performed in camera 110, the block size may be input from characterizing feature DB 486 as one possible block size associated with the searched-for characterizing features.

To take advantage of hardware acceleration, the block size (of primary block 504 or outer blocks 506) may be determined (or received or input) to have one or more of the following properties: the block size may have an odd number of pixels; the block size may have more than one pixel; the block size may have an odd number of pixels greater than one; the block may be square, rectangular, or symmetrical; the block may be centered on a pixel (e.g., centered on the center of a whole pixel); all the outer blocks may be the same size (e.g., have the same number of pixels); the outer blocks may be the same size as the primary block (e.g., have the same number of pixels); the blocks may cover a whole number of pixels; the blocks may not cover any non-whole part of a pixel; the blocks may be symmetrical about a point; the outer blocks may be the same size; the outer blocks may be different sizes; the primary block may be a different size than all or any one of the outer blocks. These properties of the size of a block may allow for the hardware accelerator (e.g., hardware accelerator 322 or the circuitry to perform the operations described herein) to perform calculations on the block without extrapolating pixels. Some embodiments, however, may nonetheless perform calculations on the block with extrapolation.

Process 600 continues with the determination of features of the operator, such as the radius of the operator and/or the number of blocks (step 610) (e.g., as measured from the primary location). When training, operator logic 420 may try different radii to find one that (e.g., in a combination with the block sizes) characterizes a feature well. Further, when training, operator logic 420 may try a different number of outer blocks to find a number that (e.g., in a combination with the block sizes and radius) characterizes a feature well. When searching, operator logic 460 may input the radius from characterizing feature DB 486 (as previously determined during training). Further, when searching, operator logic 460 may input the number of blocks from characterizing feature DB 486 (as previously determined during training).

The radius of the operator may ultimately be determined based on the size and/or shape of the feature or object that is being detected in an image. For example, to detect a feature of a Ferris wheel, the radius of the operator may correspond to the expected size of a Ferris wheel in the image. As another example, described above, to detect a feature of a face, the radius of the operator may correspond to the expected distance between a bright nose and each dark eye.

The number of outer blocks 506 may also depend on the size and/or shape of the feature or object being detected. For example, operators with a higher number of outer blocks may be associated with features with a higher frequency of intensity changes. Likewise, operators with a smaller number of outer blocks may be associated with features with a lower frequency of intensity changes. A larger number of outer blocks may be used because more outer blocks can fit around primary block 504 at the determined radius R1.

In the current example, as shown in FIG. 7A, the radius is determined to be R1 (which is measured from primary location 524) and the number of outer blocks is determined to be eight. Thus, in the current example as a result of steps 608 and 610, the operator (e.g., selected for training or retrieved from characterizing feature DB 486 for searching) is that as shown in FIG. 5B as operator 500A.

Process 600 continues with the determination of the location of the blocks (step 612). In other words, operator logic 460/420 rotates the operator described or determined in steps 608 and 610 based on an orientation, such as the gradient direction determined in step 604. For example, process 600 may determine the spacing of outer blocks 506 surrounding primary block 504.

Assume that the operator described or determined in step 608 and 610 is operator 500A and that direction logic 470/430 determines a gradient direction of 135°. In one embodiment, for example, rotating operator 500A 135° results in operator 700F as shown in FIG. 7F. In another embodiment, taking advantage of possible optimizations of hardware accelerator 322, blocks in operators are kept straight (e.g., such that a block does not include an edge that is not horizontal or vertical relative to pixels 503). Accordingly, keeping outer block 506-1 of operator 500A straight at a radius R1 from primary location 524 in the gradient direction)(135°) (determined at step 606), the center of block 506-1' falls in the center of a pixel 702 (see FIG. 7A). If the end point of radius R1 (measured from primary location 524) in the gradient direction does not fall on the center of a pixel, then operator logic 460/420 may adjust or snap the radius and/or gradient direction to the center of the closest pixel 503. As noted above, primary location 524 may also have been snapped to the center of the closest pixel 503. If camera 110 performs process 600, operator logic 460 may input the radius from characterizing feature DB 486 (e.g., as the radius associated with the searched-for characterizing feature).

Figure 7B:
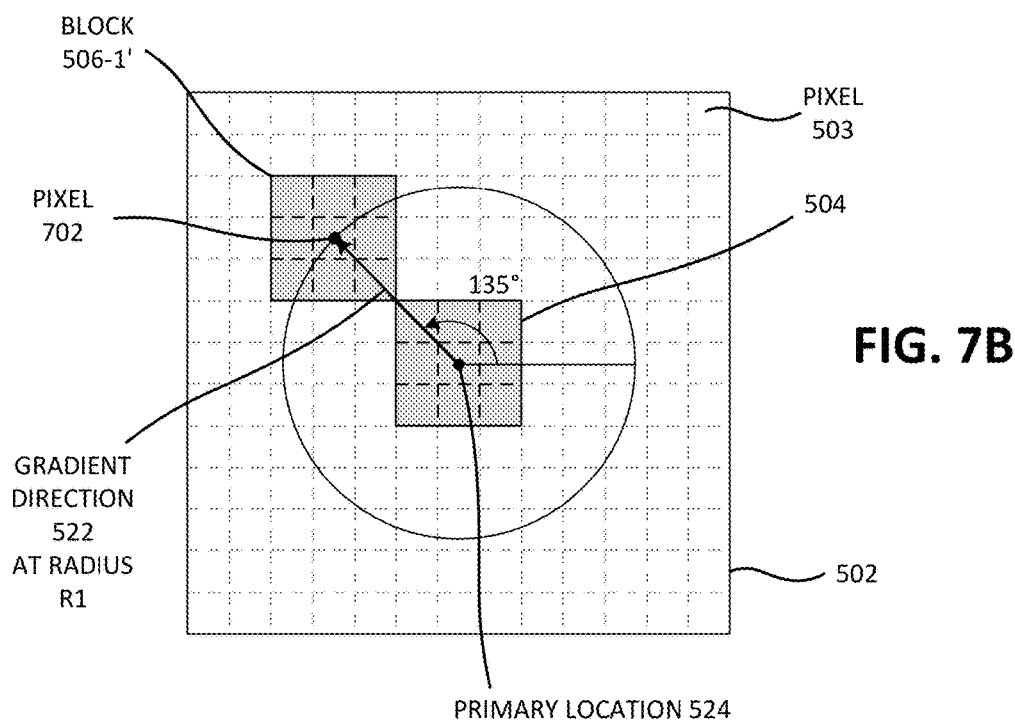
FIGS. 7B, 7C, 7D and 7E illustrate the determination of the location of a primary block and outer blocks in the operator of FIG. 5B.

With respect to primary block 504 in the current example, operator logic 460/420 determines the location of primary block 504 to be at the primary location 524 (as shown in FIG. 7B), as determined or received in process 600 at 604. In one embodiment, operator logic 460/420 selects or adjusts the location of primary block 504 to optimize the performance of hardware accelerator 322 (or the circuitry performing the operations described herein). For example, operator logic 460/420 may center primary block 504 to be over the center of a whole pixel 503. That is, operator logic 460/420 may snap the center of primary block 504 to be over the center of a whole pixel 503. The center of primary block 504 may also be snapped to cover a whole number of pixels 503.

With respect to outer blocks 506 in the current example (shown in FIG. 5B), operator logic 460/420 places outer blocks 506 to surround primary block 504 generally at a radius (e.g., R1) from the primary location and equally spaced.

The placement of the blocks may depend on the gradient direction (e.g., determined in step 606). For example, the placement of an outer block 506 may be such that it is rotated about the primary location (e.g., the center of the operator or the center of primary block 504) according to the gradient direction. The placement of outer block 506-1' in operator 500A' is shown in FIG. 7B. In this example, the center of outer block 506-1' (shown in FIG. 7B) is centered at a distance of radius R1 in the gradient direction from primary location 524. If the gradient direction is 135°, outer block 506-1 (shown in FIG. 5B) is rotated about primary location 524 to be centered over the center of pixel 702 (block 506-1' shown in FIGS. 7A and 7B). In one embodiment, if the end point of radius R1 in the gradient direction from primary location 524 does not fall on the center of a pixel (e.g., pixel 702), then the location of outer block 506-4 may be snapped such that it is centered over the pixel (e.g., the closest pixel center, such as the center of pixel 702). If the gradient direction were zero degrees, then block 506-1 would appear as it does in FIG. 5B as operator 500A. In this case (with a zero degree gradient direction), because radius R1 extends slightly farther than the center of a pixel, block 506-1 is snapped inward slightly.

Figure 7C:
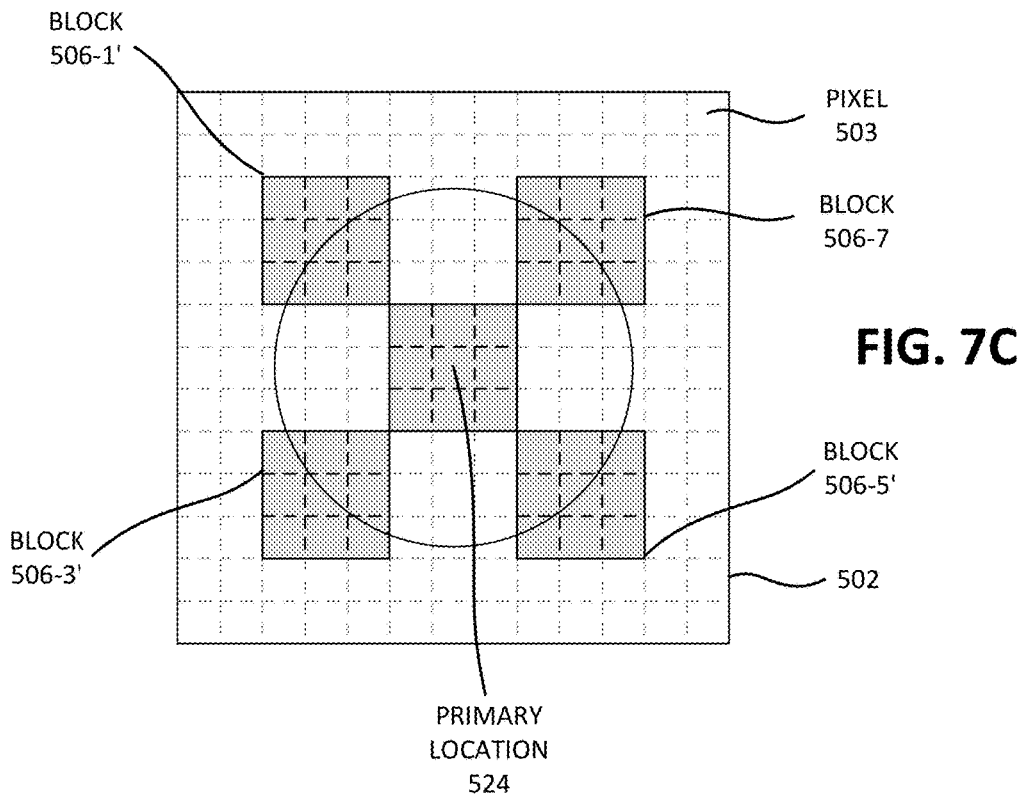

The placement of four of outer blocks 506 is shown in FIG. 7C. In this example, operator logic 460 places outer block 506-1', block 506-3', block 506-5', and 506-7' each at radius R1 from primary location 524 and each rotated 135° (relative to the positions shown in FIG. 5B). Further, the center of blocks 506-1', 506-3', and 506-5', and 506-7' are centered over a pixel 503. If the center of any of outer blocks 506-1', 506-3', 506-5', and 506-7' are not over the center of a pixel 503, then operator logic 460 may snap the blocks 506-1', 506-3', 506-5', and 506-7' such that they are (e.g., centered over the closest pixel).

If an operator had four outer blocks (i.e., blocks 506-1, 506-3, 506-5 and 506-7; and not blocks 506-2, 506-4, 506-6 and 506-8) rather than eight outer blocks; and if the blocks were rotated 135° (relative to the positions shown in FIG. 5B), then the block placements for the operator (once rotated about primary location 524) may be as shown in FIG. 7C.

Figure 7D:
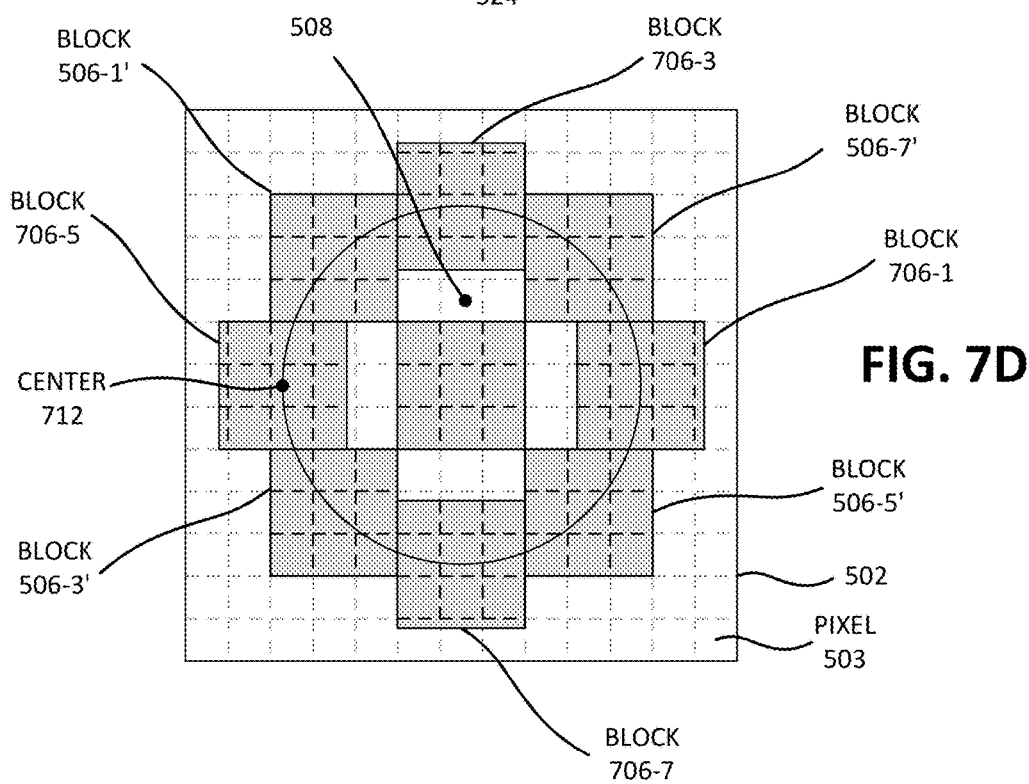
Figure 7E:
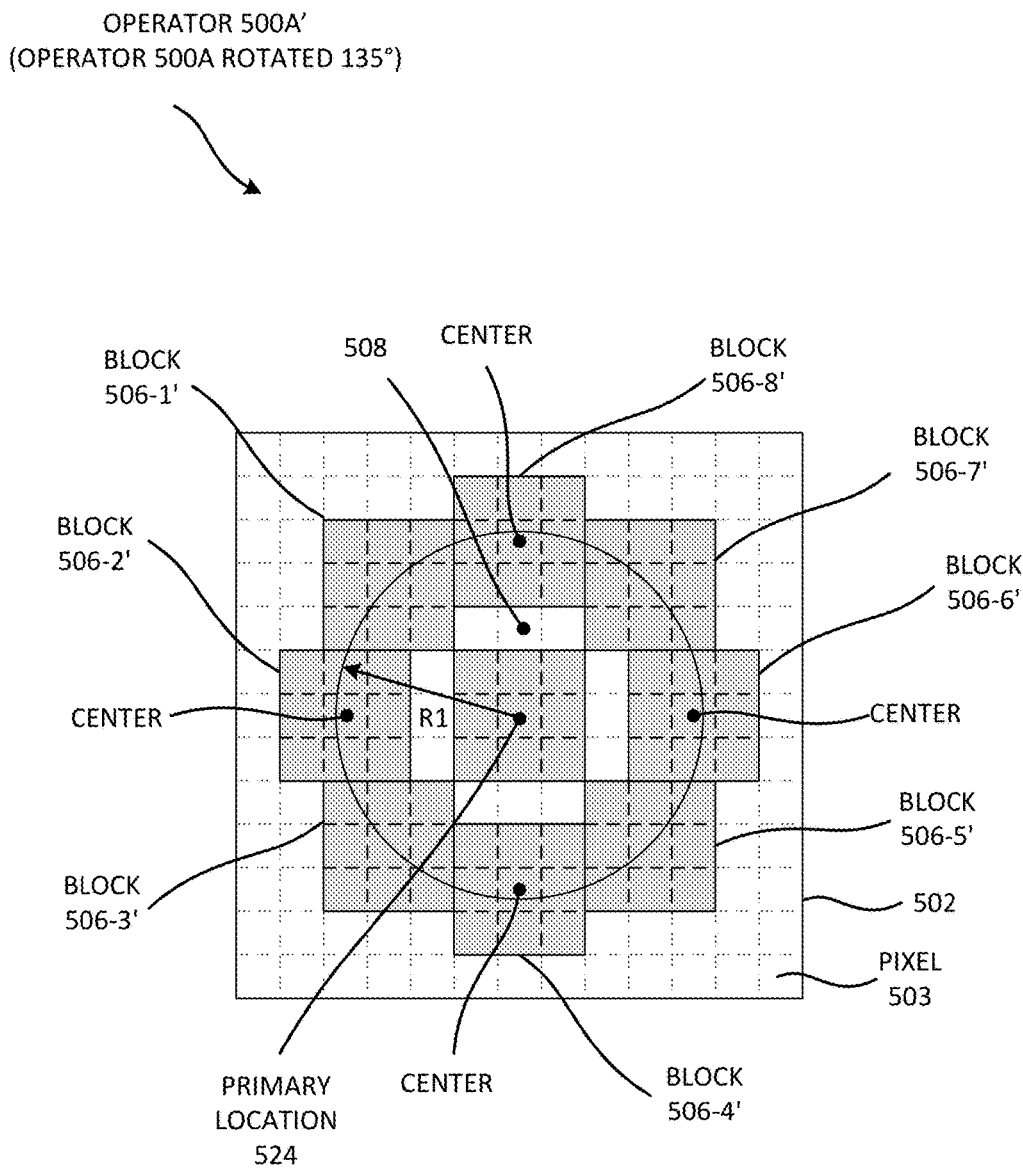
Figure 7F:
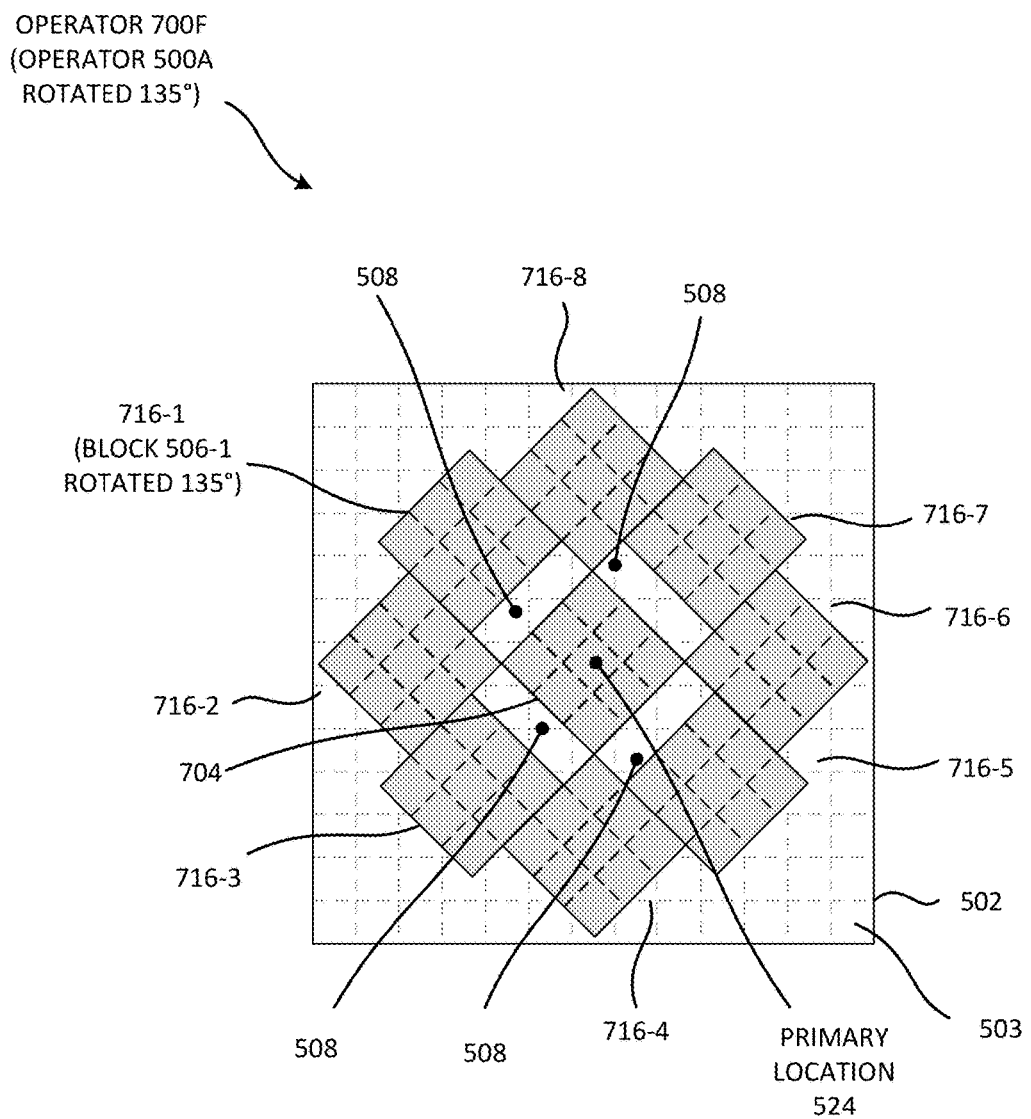
FIG. 7F illustrates an operator for quantizing a feature of an image in one embodiment.

Returning to the example of operator 500A with eight outer blocks 506, the placement of the remaining outer blocks is shown in FIG. 7D (relative to FIG. 7C). In this case, operator logic 460 may place the center 712 of outer blocks 706-2, 706-4, 706-6, and 706-8 (which correspond to outer blocks 506-2, 506-4, 506-6, and 506-8, respectively) at radius R1 from primary location 524. As illustrated in FIG. 7D, the center of outer blocks 706-2, 706-4, 706-6, and 706-8 are not centered over a whole pixel 503. Accordingly, in one embodiment, operator logic 460/420 snaps outer blocks 706-2, 706-4, 706-6, and 706-8 so that their centers are over the center of whole pixels. FIG. 7E shows the resulting operator 500A' with blocks 706-2, 706-4, 706-6, and 706-8 snapped inward (and shown as blocks 506-2', 506-4', 506-6', and 506-8', respectively).

After operator logic 460/420 snaps blocks 706 inward (as shown in FIG. 7E), the center of block 506-6' is no longer at a radius R1 away from primary location 524. Rather, the center of block 506-6' is within radius R1 from primary location 524 (i.e., the radius from primary location 524 to the center of blocks 506-2, 506-4, 506-6, and 506-8 is less than radius R1). Likewise, the center of block 506-4' is within radius R1, the center of block 506-2' is within radius R1, and the center of block 506-8' is within radius R1.

In one embodiment, determining the locations of the outer blocks surrounding the primary block may include spacing outer blocks 506 at a distance (e.g., radius R1) from primary block 504 to avoid primary block 504 from being contiguous with at least one of the outer blocks. That is, as shown in FIG. 5B, operator logic 460 may place outer blocks 506 such that the image data describes pixels 508 lying between primary block 504 and at least one of outer blocks 506. As another example, as shown in FIG. 5C, operator logic 460 may determine a radius R2 that is greater than radius R1, leaving no outer blocks 506 contiguous with primary block 504.

The feature corresponding to the operator may be quantized (step 614). To do so, operator logic 460 may turn to intensity logic 475/435 to determine a value indicative of the intensity (e.g., indicative of the average intensity) for each outer block 506 and primary block 504 (step 616). The value indicative of the intensity or the value indicative of the average intensity may include the average intensity of pixels in a block or the sum of the intensities of pixels in the block, for example. As discussed above, in the case in which primary block 504 is the same size as each outer block 506, the sum of intensities may sufficiently indicate the intensity associated with the block. Because of the determination of the location of primary block 504 and outer blocks 506, for example, hardware accelerator 322 (or the circuitry performing these operations) may be able to determine the average intensities very rapidly. The calculated value indicative of the intensities (e.g., indicative of the average intensities) may be those shown in FIG. 5D: 9 for primary block 504 and 19, 11, 12, 8, 7, 8, 6, and 20 for outer blocks 506-1 through 506-8, respectively. In one embodiment, the pixels 508 lying between the primary block and the outer block (i.e., pixels not encompassed by the blocks) do not contribute to the average intensity value of the blocks in this embodiment.

Operator logic 460/420 may also turn to threshold logic 477/437 to compare the value indicative of the intensity of primary block 504 with each value indicative of the intensity of each of outer blocks 506 (step 618). The result of the comparisons may be represented with a value, such as a binary number. If the intensity value of an outer block 506 is greater than primary block 504, then threshold logic 477/437 outputs and associates a '1' with the corresponding outer block. On the other hand, if the intensity value of an outer block 506 is less than (or equal to) the intensity value of the primary block 504, threshold logic 477/437 outputs and associates a '0' with the corresponding outer block. Alternatives to this method are described above. The intensity value may be the average intensity of the pixels in the block or the sum of the intensities of the pixels in the block (as described above). That is, if the block sizes are all the same, threshold logic 477/437 may compare the sum of intensity values of the primary block to the sum of the intensity values of the outer blocks. In one embodiment, the most significant bit is based on the location of an arbitrary outer block (such as outer block 506-1), the position of which may be changed based on the gradient direction. For example, recording of the sequence may begin with outer block 506-1 (rotated by the gradient direction) and progress counterclockwise.

As shown in FIG. 5E, threshold logic 477/437 associates a '0' with outer block 506-6' (8<9), block 506-7' (6<9), block 506-5' (7<9), and block 506-4' (8<9). Thus, threshold logic 477 may generate a value based on the comparison of the intensity value of the primary block to each of the intensity values of the outer blocks. For example, as shown in FIG. 5E, the value representing the quantized feature is '11100001.' The most significant bit (resulting from the comparison of primary block 504 with outer block 506-1') may be selected starting with the same outer block 504-1 (e.g., from operator 500A), which has been rotated about primary location 524 based on gradient direction 522. The next significant bit, in one embodiment, is the next outer block in the positive or counterclockwise direction (thus resulting in '11100001' in the current example). The selection of the most significant bit based on the same outer block 506 as rotated by the gradient direction allows for the feature to be identified in a rotation invariant manner.

The feature may be recorded possibly along with the parameters of the operator (step 620). During the training process, for example, if training device 140 determines that the quantized features is a characterizing feature, then training device 140 may store the quantized feature ('11100001') along with the parameters of the operator (e.g., size and location of primary block 504 and outer blocks 506) in characterizing features DB 486. During a search process, for example, camera 110 may compare the quantized feature (extracted during a search) to characterizing features stored in characterizing features DB 486 (previously extracted during training).

As noted above, snapping outer blocks 506 such that outer blocks 506 are centered on a pixel may result in some of outer blocks 506 overlapping so as to include the same pixel (e.g., a common internal pixel). When operator logic 460 calculates the intensity of two such outer blocks 506, the intensity of those two outer blocks 506 may be based on the intensity of that same pixel (e.g., the common internal pixel). FIG. 8 illustrates another operator 500A" in another embodiment with overlapping blocks (e.g., blocks with a common internal pixel).

In the example of FIG. 8, direction logic 470/430 determines the gradient direction to be 10° and the radius to be R1. The distance R1 from primary location 524 at 10°, however, is not at the center of a pixel 503. As a result, operator logic 460/420 snaps outer block 506-1" to the location as shown in FIG. 8. Likewise, operator logic 460/420 snaps outer block 506-2" to the location as shown in FIG. 8. As a result, outer block 506-1" and outer block 506-2" both include one in the same pixels (shown in black). Likewise, outer block 506-3" and outer block 506-4" share a pixel; outer block 506-5" and outer block 506-6" share a pixel; and outer block 506-7" and 506-8" share a pixel (all shared pixels shown in black). In the example of operator 500A", intensity logic 475/435 may use the same pixel to determine the value indicative of the intensity of two different outer blocks.

In the example of operator 500A", the threshold value associated with outer block 506-1" may be defined as the most significant bit of the quantized feature (e.g., the location of outer block 506-1" being based on the gradient vector). The value associated with outer block 506-2" becomes the second most significant as it is in the positive direction from outer block 506-1".

As shown with process 600, in one embodiment, an operator may be defined by a primary location 524, the distance (e.g., radius) from the primary location to the center of primary blocks 506 (e.g., before or after snapping primary blocks 506), the number of outer blocks 506, and/or the shapes and sizes of the blocks (i.e., primary block 504 and each of outer blocks 506). Depending on these factors, image 502 may describe pixels that lie between primary block 504 and outer blocks 506; and/or two or more of outer blocks 506 may overlap (e.g., so as to have a common internal pixel). Alternatively, depending on those factors (e.g., the distance and size of blocks), primary block 504 may overlap with one or more of outer blocks 506; and/or two or more of outer blocks 506 may overlap. In other words, primary block 504 and outer block 506 may share a common internal pixel; and/or two outer blocks 506 may share a common internal pixel. Overlapping of outer blocks 506 may occur with or without a determination of a direction that is other than zero degrees.

Figure 9A:
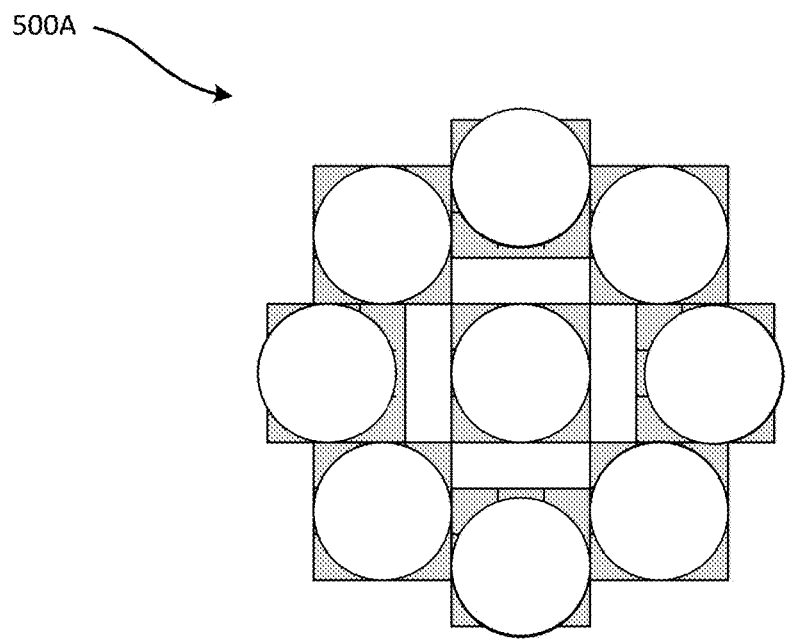
FIG. 9A compares the operator of FIG. 5B with a more idealized operator.
Figure 9B:
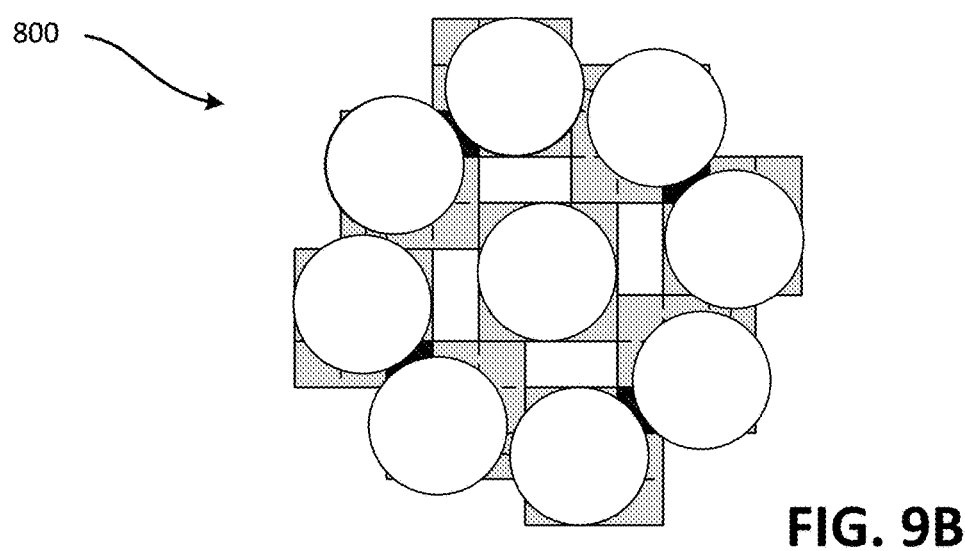
FIG. 9B compares the operator of FIG. 8 with a more idealized operator.

FIG. 9A compares operator 500A of FIG. 5A with a more idealized operator (shown with white circles). Although the idealized operator in FIG. 9A may provide more accurate results, operator 500A may be easier for camera 110 (or other hardware) to perform (e.g., require less processing power, less battery power, etc.) FIG. 9B compares operator 500A" of FIG. 8 with a more idealized operator (also shown with white circles). Although the idealized operator in FIG. 9B may provide more accurate result, operator 500A" may be easier for camera 110 to perform. The outer areas of the idealized operator of FIG. 9B have not been "snapped," making it more idealized. Even if the outer areas of the idealized operator of FIG. 9B were snapped, it still may be "more idealized" than operator 500A" because of the shape of the outer areas (i.e., circular rather than square). A "more idealized" operator may be more accurate because it is idealized, i.e., it may not have some of the approximated symmetries (e.g., of operators 500A, 500A', or 500A") and may be more "rotation invariant." These "more idealized" operators may still implement features described herein, such as overlapping outer areas (even overlapping circular areas); an outer area that overlaps with the primary area (even circular areas); or an outer/primary area that is snapped.

Figure 10A:
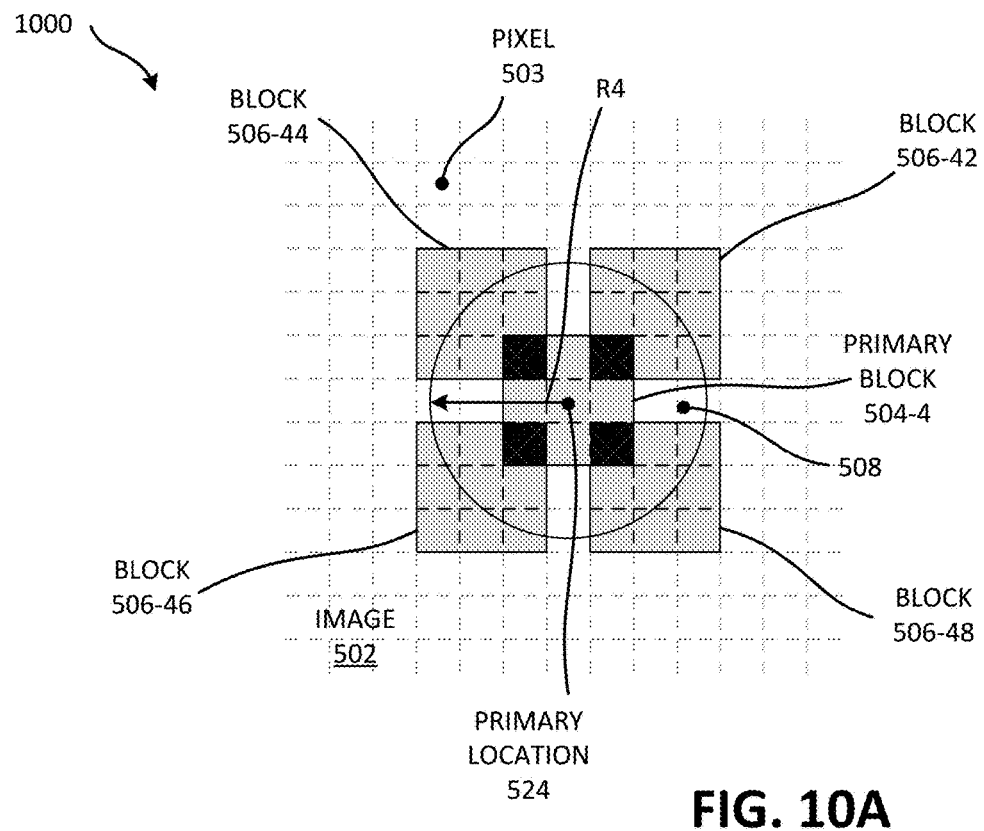
FIG. 10A illustrates an exemplary operator in another embodiment.

FIG. 10A illustrates an operator 1000 in another embodiment. That is, operator logic 460 or 420 may determine the block size, block shape, radius, etc., such that the operator appears as shown in FIG. 10A. In one embodiment, Operator 1000 includes primary block 504-4 (centered over primary location 524-4) that covers nine pixels in a three-by-three square. Outer blocks 506 (i.e., four including outer blocks 506-42, 506-44, 506-46, and 506-48) surround primary block 504-4 at approximately a radius of R4. Outer blocks 506 in operator 1000 also cover nine pixels each in a three-by-three square. That is, operator 1000 includes primary block 504-4 that is the same size as each outer block 506. In addition, operator 1000 is such that primary block 504-4 is centered over the center of a pixel 503 and each of outer blocks 506 is centered over the center of a pixel 503 in image 502.

With operator 1000, however, image 502 does not describe any pixels (e.g., external pixels) lying between primary block 504-4 and outer blocks 506. In fact, primary block 504-4 in operator 1000 overlaps with outer block 506-42 (by one common internal pixel), outer block 506-44 (by one pixel), outer block 506-46 (by one pixel), and outer block 506-48 (by one common internal pixel). In particular, each of the four corner pixels of primary block 504-4 overlap with one of the outer blocks 506 in operator 1000. These corner pixels of primary block 504 (i.e., the common internal pixels) are shaded in black. Image 502 in FIG. 10A, however, does describe pixels 508 lying between outer blocks 506 (i.e., external or omitted pixels lying between outer block 506-42 and outer block 506-44; between outer block 506-44 and outer block 506-46; between outer block 506-46 and outer block 506-48; and between outer block 506-48 and outer block 506-42).

Figure 10B:
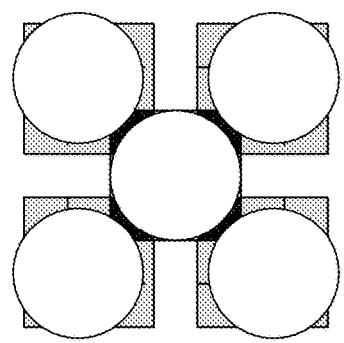
FIG. 10B compares the operator of FIG. 10A with a more idealized operator.

FIG. 10B compares operator 1000 of FIG. 10A with a more idealized operator (shown with white circles). Although the idealized operator in FIG. 10B may provide more accurate results, operator 1000 may be easier for camera 110 (or any hardware) to perform (e.g., require less processing power, less battery power, etc.)

Figure 11A:
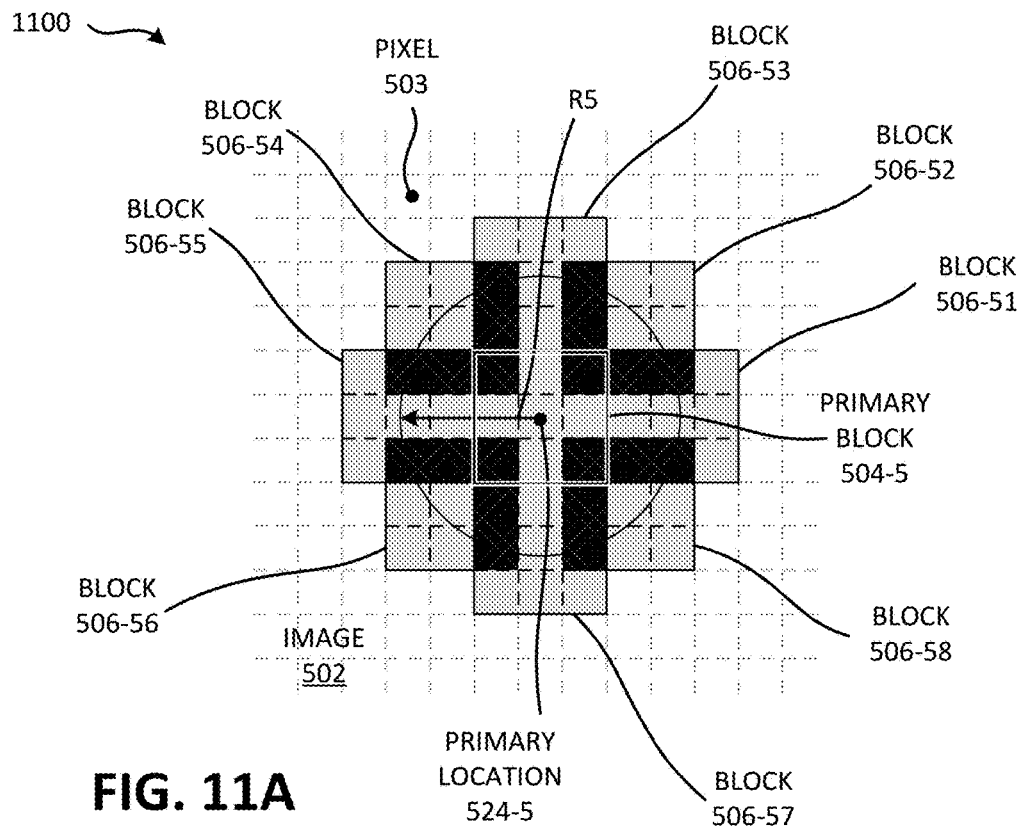
FIG. 11A illustrates an exemplary operator in another embodiment.

FIG. 11A illustrates an operator 1100 in another embodiment. That is, operator logic 460 or 420 may determine the block size, block shape, radius, etc., such that the operator appears as shown in FIG. 10A. Operator 1100 includes primary block 504-5 (centered over primary location 524-5) that covers nine pixels in a three-by-three square. Outer blocks 506 (i.e., outer blocks 506-51 through 506-58) surround primary block 504-5 at approximately a radius of R5. Outer blocks 506 in operator 1100 also cover nine pixels each in a three-by-three square. That is, operator 1100 includes primary block 504-5 that is the same size as each outer block 506. In addition, primary block 504-5 is centered over the center of a pixel 503 and each of outer blocks 506 is centered over the center of a pixel 503 in operator 1100.

As with operator 1000, image 502 in FIG. 11A does not describe any pixels (e.g., external pixels) lying between primary block 504-5 and outer blocks 506. In fact, primary block 504-5 in operator 1100 overlaps with outer block 506-52 (by one common internal pixel), outer block 506-54 (by one common internal pixel), outer block 506-56 (by one common internal pixel), and outer block 506-58 (by one common internal pixel). In particular, each of the four corner pixels of primary block 504-5 overlap with one of the outer blocks 506 in operator 1100. These corner pixels of primary block 504 are shaded in black.

Unlike operator 1000, outer blocks 506 in operator 1100 overlap with each other (e.g., include a common internal pixel). As shown in FIG. 11A, outer block 506-51 overlaps with outer block 506-52 (by two pixels); outer block 506-52 overlaps with outer block 506-53 (by two pixels); outer block 506-53 overlaps with outer block 506-54 (by two pixels); outer block 506-54 overlaps with outer block 506-55 (by two pixels); outer block 506-55 overlaps with outer block 506-56 (by two pixels); outer block 506-56 overlaps with outer block 506-57 (by two pixels); outer block 506-57 overlaps with outer block 506-58 (by two pixels); and outer block 506-58 overlaps with outer block 506-51 (by two pixels). The overlapping portions of outer blocks 506 in operator 1100 are shaded in black.

Figure 11B:
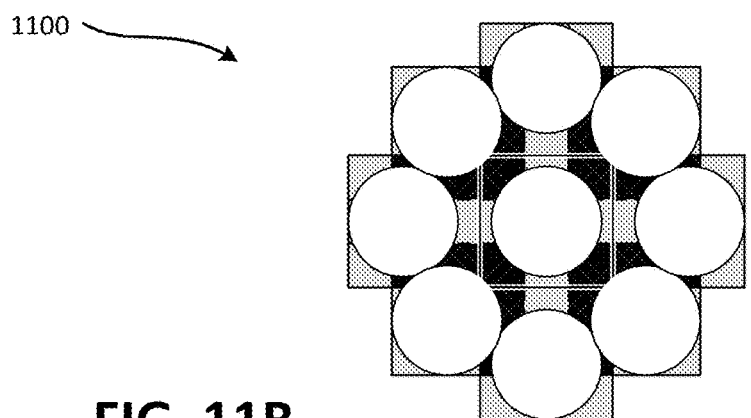
FIG. 11B compares the operator of FIG. 11A with a more idealized operator.

FIG. 11B compares operator 1100 of FIG. 11A with a more idealized operator (shown with white circles). Although the idealized operator in FIG. 11B may provide more accurate results, operator 1100 may be easier for camera 110 to perform (e.g., require less processing power, less battery power, etc.)

Figure 12A:
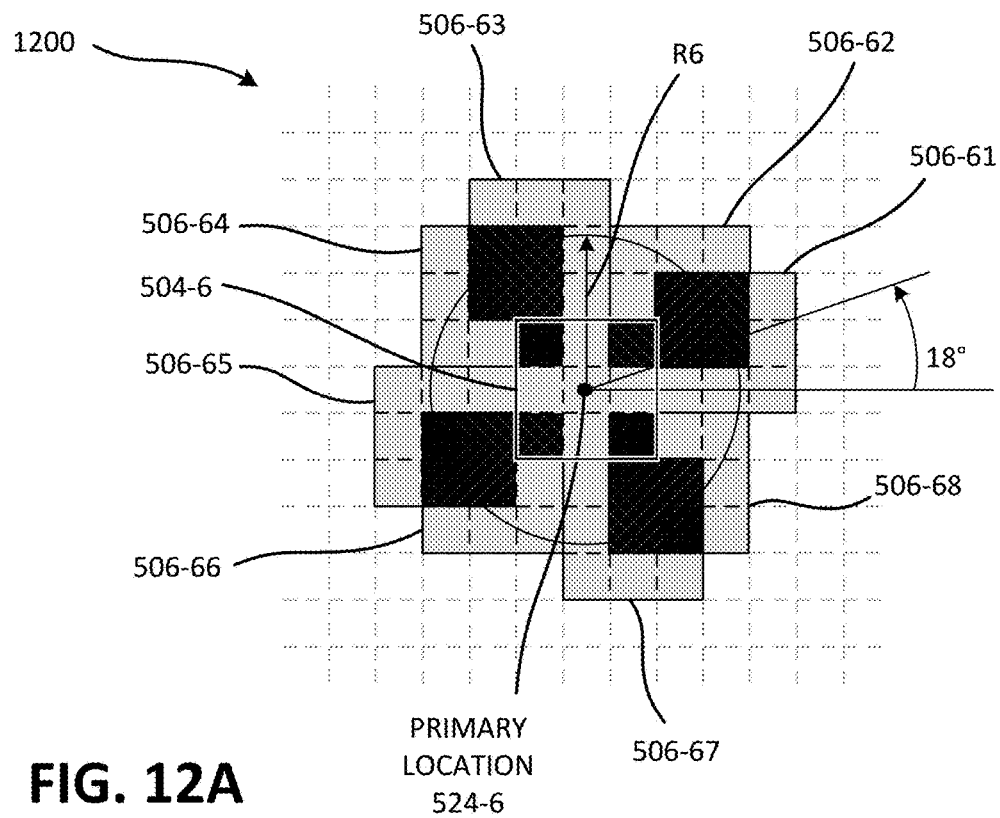
FIG. 12A illustrates an exemplary operator in another embodiment.

FIG. 12A illustrates an operator 1200 in another embodiment. That is, operator logic 460 or 420 may determine the block size, block shape, radius, etc., such that the operator appears as shown in FIG. 12A. Operator 1200 includes primary block 504-6 (centered over primary location 524-6) that covers nine pixels in a three-by-three square. In FIG. 12A, primary block 504-6 has a white showdown for increased visibility. Outer blocks 506 (i.e., outer blocks 506-61 through 506-68) surround primary block 504-5 at approximately a radius of R6. Outer blocks 506 in operator 1200 also cover nine pixels each in a three-by-three square. That is, operator 1200 includes primary block 504-6 that is the same size as each outer block 506. In addition, primary block 504-6 is centered over the center of a pixel 503 and each of outer blocks 506 is centered over the center of a pixel 503 in operator 1200.

Similar to operators 1000 (FIG. 10) and 1100 (FIG. 11), with respect to operator 1200 (FIG. 12), image 502 does not describe any pixels (e.g., external pixels) lying between primary block 504-6 and outer blocks 506. In fact, primary block 504-6 in operator 1200 overlaps with outer block 506-62 (by one common internal pixel), outer block 506-64 (by one common internal pixel), outer block 506-66 (by one common internal pixel), and outer block 506-68 (by one common internal pixel). In particular, each of the four corner pixels of primary block 504-6 overlap with one of the outer blocks 506 in operator 1200. These corner pixels of primary block 504 are shaded in black.

As with operator 1100, outer blocks 506 in operator 1200 overlap with each other (e.g., have a common internal pixel). As shown in FIG. 12A, outer block 506-61 overlaps with outer block 506-62 (by four pixels); outer block 506-62 overlaps with outer block 506-63 (by four pixels); outer block 506-63 overlaps with outer block 506-64 (by four pixels); outer block 506-64 overlaps with outer block 506-65 (by four pixels); outer block 506-65 overlaps with outer block 506-66 (by four pixels); outer block 506-66 overlaps with outer block 506-67 (by four pixels); outer block 506-67 overlaps with outer block 506-68 (by four pixels); and outer block 506-68 overlaps with outer block 506-61 (by four pixels). The overlapping portions of outer blocks 506 in operator 1200 are shaded in black.

Figure 12B:
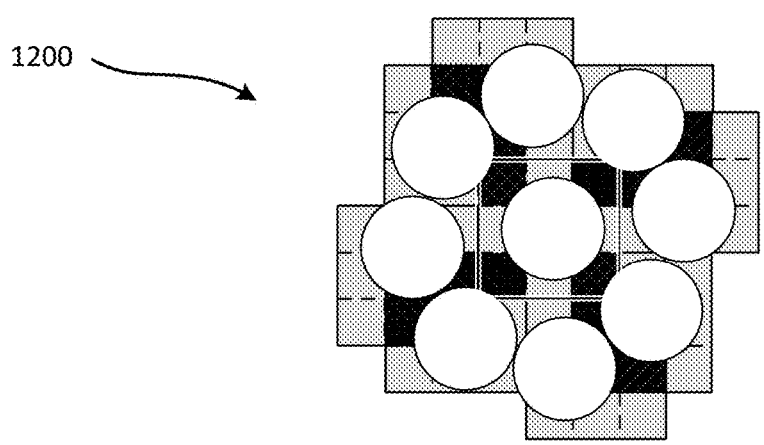
FIG. 12B compares the operator of FIG. 12A with a more idealized operator.

FIG. 12B compares operator 1200 of FIG. 12A with a more idealized operator (shown with white circles). Although the idealized operator in FIG. 12B may provide more accurate results, operator 1200 may be easier for camera 110 to perform (e.g., require less processing power, less battery power, etc.)

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to process 600 and FIG. 6, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

It should be emphasized that the terms "comprises" and/or "comprising," as used herein specify the presence of stated features, integers, steps or components but does not preclude the presence or addition of one or more other features, integers, steps, components or groups thereof. Further, the term "exemplary" (e.g., "exemplary embodiment," "exemplary configuration," etc.) means "as an example" (e.g., "an embodiment in an example," "a configuration in one example," etc.).

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method of quantifying a feature represented by image data, comprising:
   receiving image data;
   determining an operator for quantifying a feature of an image described by image data, wherein the operator includes a plurality of blocks,
      wherein the blocks include a primary block, encompassing a primary location, and outer blocks, wherein the outer blocks surround the primary block,
      wherein each of the blocks is sized to cover an odd number of pixels greater than one and each of the blocks covers an identical number of pixels,
      wherein each of the blocks is centered on a center of a pixel,
      wherein the blocks are arranged such that an external pixel of the image lies between the primary block and each of the outer blocks, wherein the external pixel does not contribute to a value indicative of an average intensity of any of the blocks;
   determining a gradient direction, about the primary location, of intensity of the image data near the primary location;
   rotating the operator about the primary location based on the gradient direction, wherein the rotated operator includes a rotated primary block and repositioned outer blocks, wherein rotating the operator includes determining locations of the repositioned outer blocks surrounding the primary block; and
   determining a value indicative of an average intensity of the rotated primary block and each of the repositioned outer blocks of the rotated operator;
   comparing the value indicative of the average intensity of the rotated primary block to each value indicative of the average intensity of each of the repositioned outer blocks; and
   quantifying a feature represented by the image data by generating a characteristic number based on the comparison.

2. The method of claim 1, wherein the blocks are arranged such that a common internal pixel of the image lies within two of the blocks, and wherein the common internal pixel contributes to each value indicative of the average intensity of each of the two blocks.

3. A method for quantifying a feature represented by image data, comprising:
   receiving image data;
   determining an operator for quantifying a feature of an image described by image data, wherein the operator includes a plurality of blocks,
      wherein the blocks include a primary block, encompassing a primary location, and outer blocks,
      wherein the outer blocks surround the primary block,
      wherein each of the outer blocks is sized to cover three, five, or more than five pixels of the image, and
      wherein the blocks are arranged such that an external pixel of the image lies between the primary block and at least one of the outer blocks, or a common internal pixel of the image lies within two of the blocks;
   determining a gradient direction, about the primary location, of intensity of the image data near the primary location;
   rotating the operator about the primary location based on the gradient direction, wherein the rotated operator includes a rotated primary block and repositioned outer blocks, wherein rotating the operator includes determining locations of the repositioned outer blocks surrounding the primary block;
   determining a value indicative of an average intensity of the rotated primary block and each of the repositioned outer blocks of the rotated operator;
   comparing the value indicative of the average intensity of the rotated primary block to the values indicative of the average intensities of the repositioned outer blocks; and
   quantifying a feature represented by the image data by generating a characteristic number based on the comparison.

4. The method of claim 3,
   wherein the primary block and each outer block covers an odd number of pixels and wherein rotating the operator includes snapping each repositioned outer block to be centered on a center of a pixel, or
   wherein the primary block and each outer block covers an even number of pixels and wherein rotating the operator includes snapping the repositioned outer blocks to cover only whole pixels.

5. The method of claim 4, wherein all the blocks cover an identical number of pixels.

6. The method of claim 3,
   wherein the image data describes external pixels lying between the rotated primary block and each of the repositioned outer blocks; and
   wherein the external pixels lying between the rotated primary block and each of the repositioned outer blocks do not contribute to the values indicative of the average intensity of any of the blocks.

7. The method of claim 3, further comprising:
   representing comparisons of the value indicative of the average intensity of the rotated primary block to each of the values indicative of the average intensity of the repositioned blocks with a binary value.

8. The method of claim 3,
   wherein the outer blocks surrounding the primary block are spaced at a distance from the primary block to avoid the primary block from being contiguous with at least one of the outer blocks.

9. The method of claim 3, further comprising:
   wherein the image data describes external pixels lying between the rotated primary block and each of the repositioned outer blocks; and
   wherein the external pixels lying between the rotated primary block and each of the repositioned outer blocks do not contribute to the values indicative of the average intensity of any of the blocks.

10. The method of claim 3,
    wherein the image data describes a common internal pixel lying within two of the repositioned outer blocks; and
    wherein the common internal pixel contributes to the value indicative of the average intensity of the two of the repositioned outer blocks.

11. The method of claim 10, wherein the operator is not congruent with the rotated operator.

12. A device comprising:

a memory to store image data;

a processor to determine an operator for quantifying a feature of an image described by image data, wherein the operator includes a plurality of blocks configured such that, the blocks include a primary block, encompassing a primary location and outer blocks surrounding the primary block, each of the outer blocks is sized to cover three, five, or more than five pixels of the image, and the blocks are arranged such that an external pixel of the image lies between the primary block and at least one of the outer blocks, or a common internal pixel of the image lies within two of the blocks; and wherein the processor is configured to:

determine a gradient direction, about the primary location, of intensity of the image data near the primary location, rotate the operator about the primary location based on the gradient direction, wherein the rotated operator includes a rotated primary block and repositioned outer blocks, and by determining locations of the repositioned blocks surrounding the primary block, determine a value indicative of an average intensity of the rotated primary block and each of the repositioned outer blocks of the rotated operator, compare the value indicative of the average intensity of the rotated primary block to the values indicative of the average intensities of the repositioned outer blocks, quantify a feature represented within the image data by generating a characteristic number based on the comparison.

13. The device of claim 12, wherein the primary block and each outer block covers an odd number of pixels and the processor is configured to snap each repositioned outer block to be centered on a center of a pixel, or wherein the primary block and each outer block covers an even number of pixels and the processor is configured to snap each repositioned outer block to cover only whole pixels.

14. The device of claim 13, wherein all the blocks cover an identical number of pixels.

15. The device of claim 12, wherein the image data describes external pixels lying between the rotated primary block and each of the repositioned outer blocks; and wherein the external pixels lying between the rotated primary block and each of the repositioned outer blocks do not contribute to the values indicative of the average intensity of any of the blocks.

16. The device of claim 12, wherein the processor is configured to represent comparisons with a binary value by representing the comparison with a first of two values if the value indicative of the average intensity of the rotated primary block is greater than the value indicative of the average intensity of the repositioned outer block, and representing the comparison with a second of two values if the value indicative of the average intensity of the rotated primary block is less than the value indicative of the average intensity of the repositioned outer block.

17. The device of claim 12, wherein the outer blocks surrounding the primary block are spaced at a distance from the primary block to avoid the primary block from being contiguous with at least one of the outer blocks.

18. The device of claim 12, wherein each of the outer blocks is centered on a pixel.

19. The device of claim 12, wherein the image data describes a common internal pixel lying within two of the repositioned outer blocks; and wherein the common internal pixel contributes to the value indicative of the average intensity of the two of the repositioned outer blocks.

20. The device of claim 19, wherein the operator is not congruent with the rotated operator.

* * * * *